US008421675B2

(12) United States Patent
Rhoads et al.

(10) Patent No.: US 8,421,675 B2
(45) Date of Patent: Apr. 16, 2013

(54) SYSTEMS AND METHODS FOR LOCATING A MOBILE DEVICE WITHIN A CELLULAR SYSTEM

(75) Inventors: Geoffrey B. Rhoads, West Linn, OR (US); Tom Tewalt, Oregon City, OR (US); Hugh L. Brunk, Portand, OR (US); Tyler J. McKinley, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 782 days.

(21) Appl. No.: 12/426,787

(22) Filed: Apr. 20, 2009

(65) Prior Publication Data

US 2009/0233621 A1    Sep. 17, 2009

Related U.S. Application Data

(63) Continuation-in-part of application No. 12/355,436, filed on Jan. 16, 2009, now Pat. No. 7,876,266, which is a continuation of application No. PCT/US2007/025172, filed on Dec. 7, 2007.

(60) Provisional application No. 60/873,891, filed on Dec. 7, 2006.

(51) Int. Cl.
*G01S 3/02* (2006.01)
*H04W 4/02* (2009.01)

(52) U.S. Cl.
USPC ........................................ 342/463; 455/456.5

(58) Field of Classification Search .................. 342/387, 342/451, 463–465; 455/456.1–457
See application file for complete search history.

(56) References Cited

U.S. PATENT DOCUMENTS

| | | | |
|---|---|---|---|
| 4,405,986 A | 9/1983 | Gray | |
| 5,045,861 A | 9/1991 | Duffett-Smith | |
| 5,838,279 A | 11/1998 | Duffett-Smith et al. | |
| 6,084,547 A | 7/2000 | Sanderford et al. | |
| 6,094,168 A | 7/2000 | Duffett-Smith et al. | |
| 6,275,705 B1 | 8/2001 | Drane et al. | |
| 6,529,165 B1 | 3/2003 | Duffett-Smith et al. | |
| 6,650,877 B1 | 11/2003 | Tarbouriech et al. | |
| 6,806,830 B2 | 10/2004 | Panasik et al. | |
| 6,894,644 B2 | 5/2005 | Duffett-Smith et al. | |

(Continued)

OTHER PUBLICATIONS

H. Feng et al., Positioning models and systems based on digital television broadcasting signals, Frontiers of Electrical and Electronic Engineering in China, vol. 2(4), p. 410-414, 2007.*

(Continued)

*Primary Examiner* — Jack W Keith
*Assistant Examiner* — Fred H Mull
(74) *Attorney, Agent, or Firm* — Digimarc Corporation

(57) ABSTRACT

A system for determining location and timing information in a cellular network includes a space-time calibration unit (SCU) and a plurality of nodes in communication with the SCU. Each node includes a node ping driver that receives frame synchronization information from a respective subset of cell sites, and associates the frame synchronization information with respective receive count stamps generated using a local node clock. The system also includes a user handset that includes a handset ping driver that receives the frame synchronization information from a serving cell site and one or more neighbor cell sites, and associates the frame synchronization information with respective receive count stamps generated using a local handset clock. The SCU uses the information from the node and handset ping drivers to determine a handset location.

16 Claims, 19 Drawing Sheets

U.S. PATENT DOCUMENTS

| | | |
|---|---|---|
| 7,224,984 B2 | 5/2007 | Agrawala et al. |
| 7,260,407 B2 | 8/2007 | Duffett-Smith et al. |
| 7,315,745 B2 | 1/2008 | Duffett-Smith et al. |
| 7,359,719 B1 | 4/2008 | Duffett-Smith et al. |
| 7,382,804 B2* | 6/2008 | Alapuranen et al. ........ 455/456.1 |
| 7,508,883 B2 | 3/2009 | Duffett-Smith et al. |
| 7,593,736 B1 | 9/2009 | Duffett-Smith et al. |
| 7,826,837 B1 | 11/2010 | Sylvester |
| 7,876,266 B2 | 1/2011 | Rhoads |
| 7,983,185 B2 | 7/2011 | Rhoads et al. |
| 2001/0004601 A1* | 6/2001 | Drane et al. .................. 455/456 |
| 2003/0001776 A1 | 1/2003 | Hannah et al. |
| 2003/0054838 A1* | 3/2003 | Carrez .......................... 455/456 |
| 2003/0220117 A1 | 11/2003 | Duffett-Smith et al. |
| 2004/0046693 A1 | 3/2004 | Ogino et al. |
| 2005/0137786 A1 | 6/2005 | Breed et al. |
| 2007/0001903 A1 | 1/2007 | Smith et al. |
| 2007/0066231 A1 | 3/2007 | Duffett-Smith et al. |
| 2007/0200759 A1 | 8/2007 | Heidari-Bateni et al. |
| 2007/0247368 A1 | 10/2007 | Wu |
| 2009/0061899 A1* | 3/2009 | Hwang et al. .............. 455/456.2 |
| 2009/0073030 A1 | 3/2009 | Hansen et al. |
| 2009/0111482 A1 | 4/2009 | Rowe et al. |
| 2009/0213828 A1 | 8/2009 | Brundage et al. |
| 2009/0273518 A1 | 11/2009 | Duffet-Smith et al. |
| 2009/0281729 A1 | 11/2009 | Duffett-Smith et al. |
| 2009/0313370 A1 | 12/2009 | Rhoads |
| 2010/0202300 A1 | 8/2010 | Rhoads et al. |

OTHER PUBLICATIONS

Enge, P. et al., "Special Issue on Global Positioning System," Proceedings of the IEEE, vol. 87(1), p. 3-15, Jan. 1999.

Braasch, M.S. et al., "GPS Receiver Architectures and Measurement," Proceedings of the IEEE, vol. 87(1), p. 48-64, Jan. 1999.

Misra, P. et al., "GPS Performance in Navigation," Proceedings of the IEEE, vol. 87(1), p. 65-85, Jan. 1999.

GPS Joint Program Office, "Naystar GPS Space Segment/Navigation User Interfaces," Naystar Global Positioning System, Interface Specification, IS-GPS-200, Revision D., ARINC Engineering Services, LLC, Dec. 7, 2004.

US. Joint Planning and Development Office (JPDO), Air Navigation Services Working Group, FAA's "Surveillance/Positioning Backup Strategy Alternatives Analysis." Paper No. 08-003, Jul. 15, 2008.

US. Federal Aviation Administration, "Fact Sheet- NextGen." Feb 14. 2007, available at http://www.faa.govinews/fact_sheets/news_story.cfm?newsID=8145.

Appeal Brief dated May 3, 2012, and Examiner's Answer dated Jul. 24, 2012, in U.S. Appl. No. 12/373,944.

Notice of Allowance dated Jun. 13, 2012, in U.S. Appl. No. 12/429,030.

* cited by examiner

ZT Node Table 624

| Cell ID | Frequency or Sector | TX Frame Adjustment | SFN-SFN | ZT Node Counter | SFN | ZT Node Clock Result | TX-RX Delay |
|---|---|---|---|---|---|---|---|
| CA-316 | 114 | .0000000123 | 0 | 01234567989abf | 224 | 623.1478955 | 0.000006589 |
| OR-110 | 110 | 0 | 7.256895 | 01234567989abf | 224 | 525.63217 | 0 |
| CA-415 | 08 | 0 | 7.96562 | 01234567989abf | 224 | 120.2325 | 0 |
| OR-111 | 78 | 0 | 10.0325 | 01234567989abf | 224 | 8500.232155 | 0 |
| CA-4316 | 120 | 0 | 15.2365987 | 01234567989abf | 224 | 623.1478955 | 0 |

FIG. 7

Database Node Table 910

| ZT Node Number | Lat | Long | AMSL | Ant AGL | Cab Dely | Address | Contact Info | Neighbor Cell | ZTmodCor |
|---|---|---|---|---|---|---|---|---|---|
| Node 1 | | | | | | | | OR 3459a | 0123348459 |
| Node 2 | | | | | | | | OR 3459a | 3949003934 |
| Node 3 | | | | | | | | | |

| Neighbor Cell | ZTmodCor |
|---|---|
| OR 0001 | 3839866 |
| OR 0001 | 12389490 |
| | |

FIG. 9

Database Cell Site Table 1000

| Sector ID | Latitude | Longitude | AGL | AMSL | Cable Delay | Cell Site | QOS RSSI | Site Change |
|---|---|---|---|---|---|---|---|---|
| OR 3459B | 46.8394 | 122.264849 | 100 | 100 | .01 usec | 00001 | 29 | N |
| OR 3459A | 46.8394 | 122.264849 | 100 | 100 | .01 usec | 00001 | 36 | N |
| OR 0001 | 45.0123 | 122.26001 | 50 | 300 | .005 usec | 00002 | 45 | N |

Cell Site List

| Serving Cell 10 |
|---|
| Neighbor Cell 11 |
| Neighbor Cell 12 |
| Neighbor Cell 13 |
| Neighbor Cell 15 |
| Neighbor Cell 20 |

1312

ZT Node List

| ZT Node 4 | Serving Cell 10 |
|---|---|
| ZT Node 2 | Neighbor Cell 11 |
| ZT Node 6 | Neighbor Cell 12 |
| ZT Node 10 | Neighbor Cell 13 |
| ZT Node 9 | Neighbor Cell 15 |
| ZT Node 12 | Neighbor Cell 20 |

SYSTEMS AND METHODS FOR LOCATING A MOBILE DEVICE WITHIN A CELLULAR SYSTEM

RELATED APPLICATION

This application is a continuation-in-part of U.S. patent application Ser. No. 12/355,436, filed Jan. 16, 2009, which is a continuation of International Application No. PCT/US2007/025172, filed Dec. 7, 2007, which claims benefit of U.S. Provisional Patent Application No. 60/873,891, filed Dec. 7, 2006, each of which are hereby incorporated herein in their entirety.

TECHNICAL FIELD

This disclosure is related to object positioning systems. More particularly, this disclosure is related to determining locations of mobile devices within a cellular communication system.

BACKGROUND INFORMATION

For cellular systems, current techniques for determining a location of a mobile device include using a Global Positioning System (GPS), Assisted GPS (A-GPS), Time Difference of Arrival (TDOA), Enhanced Observed Time Difference (E-OTD), Radio Fingerprinting, Cell Global Identity, and Enhanced Cell ID.

GPS is a space-based satellite constellation that provides constant, global geopositioning to end users. A user's GPS device processes signals from three or more GPS satellites, and by way of trilateration provides latitude and longitude data. GPS may be global, but it is not ubiquitous because foliage, building edifices, and bridges block GPS signals. The absence of GPS signals in places such as the urban core is problematic because high value applications for reliable positioning abound, yet no reliable solution exists. The urban core in major cities is also known as the "urban canyon," because skyscrapers on both sides of the streets block GPS signals. Another common problem is multipath distortion in which signals bounce off many surfaces before reaching the user, resulting in vastly inaccurate positioning data.

In addition to providing navigation within the urban core, GPS is widely used to aid navigation worldwide. GPS was originally designed as a military system and has had recent broad adoption for civil and civilian uses due to its inherent accuracy and a strong history of reliable performance. Several other entities, including the European Union, Russia, India, China, and Japan have satellite-based Position, Navigation, and Timing deployed or in the process of deploying. Collectively, the use of satellite-based navigation services is referred to a Global Navigation Satellite Systems (GNSS). GPS, however, remains the de facto system of choice, primarily because of its maturity, with over fifteen years of reliable free service. GPS acceptance has also been enhanced by open interface control documentation (ICD), which allows receiver manufacturers to confidently design systems against a reliable standard.

Because GNSS systems are satellite-based, however, there is a danger that either natural or human threats to these systems could make them vulnerable to outages. Further, other locating systems such as E-OTD may not provide a desired level of accuracy or may be overly expensive.

SUMMARY OF THE DISCLOSURE

A cellular system determines space-time solutions for at least one mobile user handset using frame synchronization information provided by a plurality of cell sites. In one embodiment, a system for determining location and timing information in a cellular network includes a space-time calibration unit (SCU) and a plurality of nodes in communication with the SCU. Each node includes a node ping driver and may be referred to herein as a "ZT node." Each node ping driver is configured to receive frame synchronization information from a respective subset of cell sites, associate the frame synchronization information with respective receive count stamps generated using a local node clock, and provide the frame synchronization information and associated receive count stamps to the SCU. The system also includes a user handset that includes a handset ping driver configured to receive the frame synchronization information from a serving cell site and one or more neighbor cell sites, associate the frame synchronization information with respective receive count stamps generated using a local handset clock, and provide the frame synchronization information and associated receive count stamps to the SCU. The SCU is configured to determine a user handset location based at least in part on the frame synchronization information with its associated receive count stamps. The SCU then provides the user handset location to the user handset.

In certain embodiments, the SCU is further configured to determine cell site locations based on known node locations and the frame synchronization information with its associated receive count stamps. The SCU may determine the user handset location based on the determined cell site locations and known node locations. In some embodiments, the known node locations are manually determined and provided to the respective nodes as the nodes are installed within the system. In other embodiments, the known node locations are automatically determined using a positioning system such as GPS. In such embodiments, at least one of the nodes may be mobile.

In certain embodiments, the SCU is located within at least one location selected from the group comprising a server in communication with the cell sites, one or more of the cell sites, one or more of the nodes, and the user handset.

In certain embodiments, the SCU determines the user handset location by generating a cell site list that includes the serving cell site and the one or more neighbor cell sites that are in communication with the user handset, and generating a node list that includes at least one node for the serving cell site and each of the one or more neighbor cell sites in the cell site list. For a particular frame number corresponding to the first frame synchronization information and the second frame synchronization information, the SCU also compares the associated receive count stamp generated using the local handset clock to the associated receive count stamps generated using the local node clocks in each of the nodes in the node list, and determines the user handset location based on the comparison.

Additional aspects and advantages will be apparent from the following detailed description of preferred embodiments, which proceeds with reference to the accompanying drawings.

BRIEF DESCRIPTION OF THE DRAWINGS

FIG. 7 graphically represents an example ZT node table according to one embodiment.

FIG. 9 schematically illustrates a database node table according to one embodiment.

FIG. 10 schematically illustrates a cell site table according to one embodiment.

DETAILED DESCRIPTION OF PREFERRED EMBODIMENTS

Figure 1:
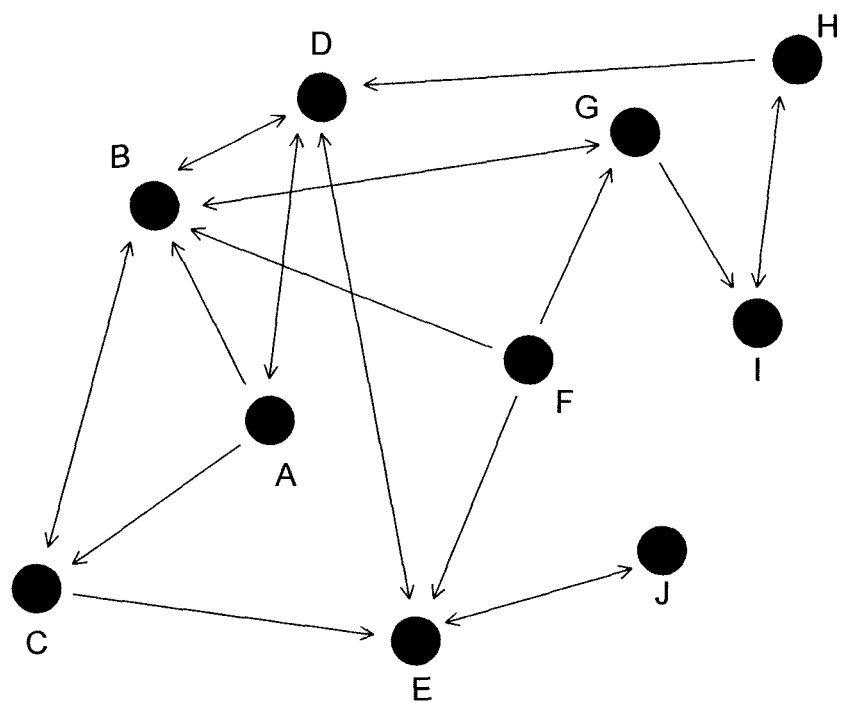
FIG. 1 illustrates a network of nodes according to one embodiment.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

A. Overview

A precision timing/location technology referred to as "PhaseNet" is described in International Patent Application Publication No. WO/2008/073347, filed Dec. 7, 2007, by Geoffrey Rhoads (the "Rhoads application"), which is assigned to the assignee of the present application. As discussed in detail below, in general, the PhaseNet algorithms run on the nodes of a network, and messages passed between the nodes serve as input to the algorithms. Each node includes an independent, free-running clock or counter that runs at its own rate with respect to a common network system time. In one embodiment, the common network system time may be defined in simplistic terms as an average of the node clocks within the system. As disclosed herein, the PhaseNet algorithms are configured to determine the common network system time. Artisans will recognize from the disclosure herein that many other system clock determination techniques are possible. For example, if one of the system nodes operates with an atomic clock, that clock can establish the system clock with extremely small clock drift.

In operation, each node receives enough information from the other nodes to solve the PhaseNet algorithms to determine its own location with respect to the other nodes and to determine corrections to its own internal clock rate with respect to the overall system clock rate.

FIG. 1 illustrates a network 100 that includes ten nodes A, B, C, D, E, F, G, H, I, J according to one embodiment. The network 100 may include different numbers of nodes and nodes may be added to or removed from the network 100 at any time. In this example, it is assumed that some of the nodes move with respect to the other nodes. For example, some of the nodes may be a cellular handset or may be located in moving vehicles. Lines between nodes represent communication links (either a duplex link or a monoplex link). For simplicity, FIG. 1 does not show lines between each node. However, in the general case, it is assumed that each node may establish duplex communication with any of the other nodes. Further, while the nodes in FIG. 1 are illustrated as being located in a two-dimensional plane, an artisan will recognize from the disclosure herein that nodes may be distributed in a three-dimensional space.

As discussed in detail below, the general PhaseNet algorithms exploit at least two aspects of wireless networks. The first aspect is that, by nature, the nodes A, B, C, D, E, F, G, H, I, J in the network 100 are configured to pass messages between one another. The second aspect of the network 100 used by the PhaseNet algorithms is that, as discussed below, each node A, B, C, D, E, F, G, H, I, J has a local clock that may be used to time stamp the sending and receiving of messages.

In the general case, the messages passed between two network nodes take the form of pings and pungs. A ping transmit event includes a time stamped message from one node to another. The sending node appends to the message the value of its counter at the instant the message is transmitted. The receiving node then takes note of the value of its own counter when the message is received. The data resulting from a ping event includes, most basically, of a pair of count values. The first count is the clock value of the sending node when the ping transmit event was sent, and the second count is the clock value of a receiving node when it received the ping transmit event. The term pung is used to refer to any data communication between nodes of the network, such as sharing the data resulting from ping events, which is not itself a ping event. The general PhaseNet algorithms take the data resulting from ping events and pungs and use it to solve for timing and/or location information useful for the nodes A, B, C, D, E, F, G, H, I, J of the network 100. The specific form of this information is application dependent.

Figure 2:
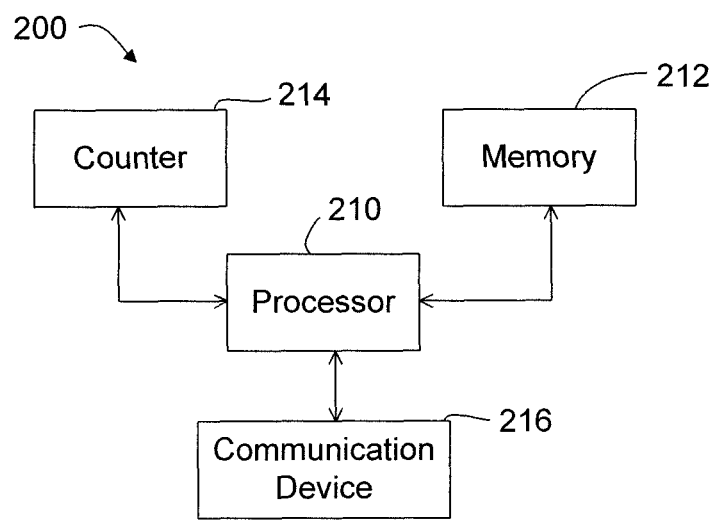
FIG. 2 is a block diagram of a node according to one embodiment.

FIG. 2 is a block diagram of a node 200 according to one embodiment. The node 200 shown in FIG. 2 may correspond, for example, to one or more of the nodes A, B, C, D, E, F, G, H, I, J shown in FIG. 1. The node 200 includes a processor 210 in communication with a memory device 212, a counter 214, and a communication device 216. The processor 210 may include, for example, digital signal processors, one or more field-programmable gate array (FPGA), general purpose single-chip or multi-chip microprocessors, special purpose processors, combinations of the foregoing, or the like. The memory device 212 may include, for example, random access memory (RAM), hard drives, drives that accept hard or floppy disks, tape cassettes, CD-ROM, DVD-ROM, or other computer-readable storage media. The memory device 212 includes program instructions that are executable by the processor 210 for determining space-time solutions as described herein. The memory device 212 may also include one or more databases (not shown) for storing data used to calculate the space-time solutions.

The communication device 216 is configured to provide communication with other nodes. In certain embodiments, the communication device 216 also provides an interface to other timing/location systems such as a GPS device. As discussed above, the communication device 216 in certain embodiments is configured to wirelessly communicate with a cellular network. An artisan will recognize from the disclosure herein that many different communication networks and/or protocols may be used depending on the particular application.

In one embodiment, the counter 214 is driven by a low cost digital clock (not shown). The counter 214 may have at least a 64-bit counting range. In one embodiment, the counter 214 is capable of running at approximately 1 million counts per second. The counter 214 may be built using cascades of counters, with 8 or 16-bit counters running at the highest speed, and driving lower rate 64-bit counters, for example. Of course, an artisan will recognize from the disclosure herein that many other configurations may also be used. Given that PhaseNet solutions ultimately solve for count-rate variability between nodes, their quality may be commensurate with extremely low-cost parts and very basic performance specifications. In other words, the PhaseNet solutions determine a common network system time that is substantially more accurate than the local time of any individual node within the network. Thus, while the PhaseNet algorithms produce space-time solutions that are commensurate with the quality of input parameters such as the accuracy of the local counters 214, the PhaseNet algorithms produce space-time solutions are more accurate than the individual timing accuracies in the individual nodes.

In certain embodiments disclosed herein, the network includes a cellular mobile telephone network with at least one mobile user handset in communication with a plurality of cell sites. As discussed in detail below with respect to FIG. 4, a particular mobile user handset may be in voice/data communication with only one cell site (e.g., a serving cell site) at any one time and in communication with one or more additional cell sites (e.g., neighbor cell sites) with which the mobile user handset exchanges other types of information such as handoff information and neighbor list information. As used herein, a "cell site" is a broad term that includes its normal and customary meaning and is sufficiently broad to include, for example, a radio base station (RBS), a Node B base station in a universal mobile telecommunication system (UMTS), base station in a global system for mobile communications (GSM), a base transceiver station (BTS), a femtocell, and/or picocell. Further, a "handset" is a broad term that includes its normal and customary meaning and is sufficiently broad to include, for example, a mobile phone (e.g., cellular handset), a laptop computer or handheld device with a wireless data card, or other types of user equipment (UE) capable of communicating voice and/or data through the cell sites.

Figure 3:
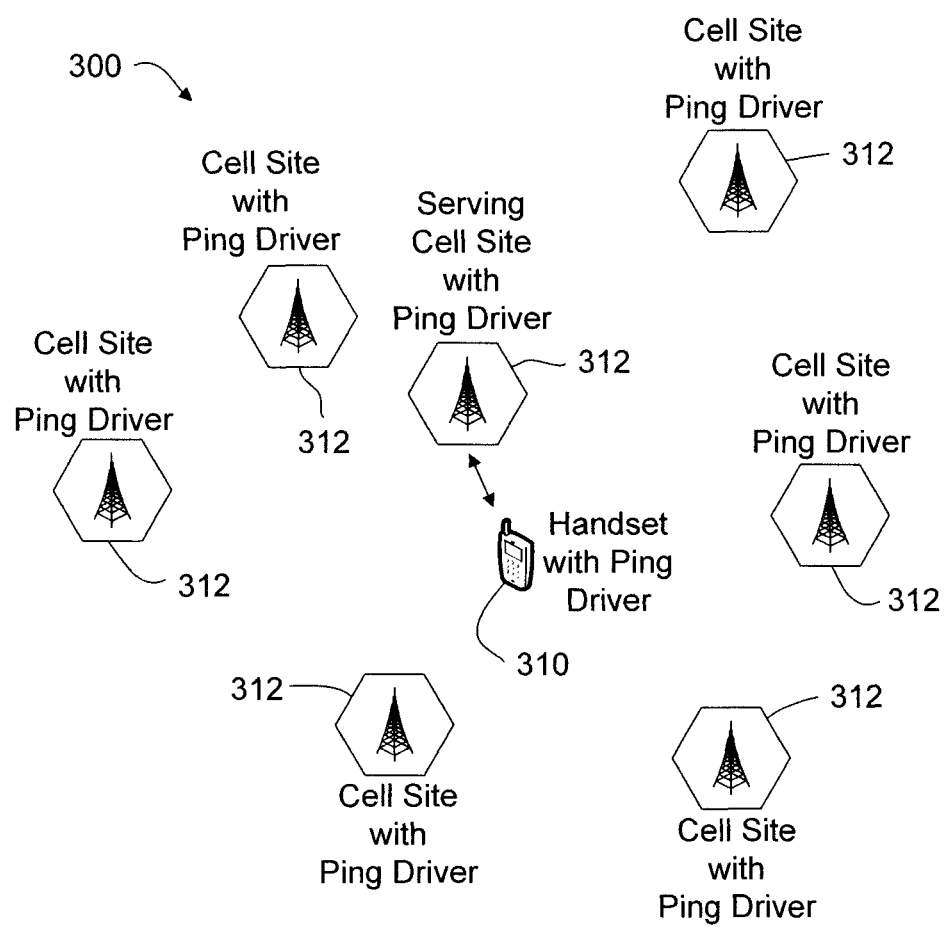
FIG. 3 is a block diagram of a cellular mobile telephone system that includes a user handset and a plurality of cell sites that each include a ping driver for exchanging transmit ping events according to one embodiment.

In certain cellular network embodiments, the nodes used for determining location information include a plurality of cell sites and at least one mobile user handset. In this embodiment, the plurality of cell sites and the at least one mobile user handset are configured to exchange timing information with one another. For example, FIG. 3 illustrates a block diagram of a cellular mobile telephone system 300 that includes a user handset 310 and a plurality of cell sites 312 (seven shown) that each include a ping driver (not shown) for exchanging transmit ping events according to one embodiment. In the system 300 shown in FIG. 3, each ping driver periodically transmits messages with transmit count stamps to the other nodes (the user handset 310 and the cell sites 312), generates receive ping events by associating receive count stamps with transmit ping events received from other nodes, and periodically provides pung messages with the accumulated data to one or more of the other nodes for processing the location of the user handset 310 based on known cell site locations.

Generally, however, accurate cell site location information is not always available. Further, it may not always be possible to modify cell sites with ping drivers so as to exchange timing information between nodes. For example, a cellular system's owner or carrier may not allow modifications of cell sites and/or access to cell site information (such as cell site clock information) that is not normally provided to user equipment. Thus, in other cellular network embodiments, cell sites are not modified to include ping drivers. Example carrier-independent embodiments (e.g., embodiments that do not modify a carrier's cell sites and/or that do not have access cell site clock information) are disclosed below.

Such carrier-independent embodiments use frame synchronization information provided by the cell sites to properly sort data that is then provided to the PhaseNet algorithms. Cellular systems use duplex frequencies (e.g., the transmit frequency is different than the receive frequency), and provide synchronization so that calls are properly bit timed and/or properly assigned to a timing slot. Third-generation (3G) UMTS mobile communications technology, for example, uses frame synchronization and wideband code division multiple access (WCDMA) technology for wireless communications. In UMTS/WCDMA 3G, the frame synchronization is based on a system frame number (SFN). Whereas, in second-generation (2G) GSM, synchronization is based on a quarter symbol number (QN), a symbol number or bit number (BN), a time slot number (TN), and a frame number (FN).

In the example carrier-independent embodiments disclosed below, separate cellular communication devices referred to herein as "ZT nodes" are provided to passively monitor frame synchronization information transmitted by the cell sites. The ZT nodes associate local count stamps with the frame synchronization information and provide the accumulated information to a space-time calibration unit (SCU) for processing to determine the cell site locations. Thus, it is not necessary in certain embodiments to know the location of each cell site beforehand.

A user handset that requests location information also accumulates frame synchronization information from the cell sites and associates its own local count stamps with the frame synchronization information. The requesting user handset provides this information to the SCU. The SCU compares the synchronization and count stamp information from the ZT nodes and the requesting user handset. The SCU provides the comparison as inputs to the PhaseNet algorithms (which are discussed in detail below) to determine the location of the user handset. The SCU then provides the requested location information (e.g., latitude, longitude, and elevation) to the user handset.

B. Example Carrier-Independent Embodiments

Example carrier-independent embodiments are now provided that allow for determining location information for one or more user handsets when modifications to a carrier's cell sites are not available and/or when accurate location information for the cell sites is not known beforehand. While these embodiments may be used without (or with minimal) carrier cooperation, an artisan will recognize from the disclosure herein that these example embodiments may also be used when full cooperation is available from the carrier. For example, a carrier may allow ping drivers to be installed in some or all of its cell sites to provide count stamp messages to be exchanged between the cell sites and between the cell sites and the user handsets. However, such a carrier may not have the precise location of each cell site in its system. Or, if precise cell site locations are initially determined (e.g., through surveying or GPS methods used during system installation), one or more of the cell sites may later experience a physical change such that the precise physical locations of all cell sites are no longer known. Thus, these example carrier-independent embodiments may be used to provide or update the cell-site location information.

Figure 4:
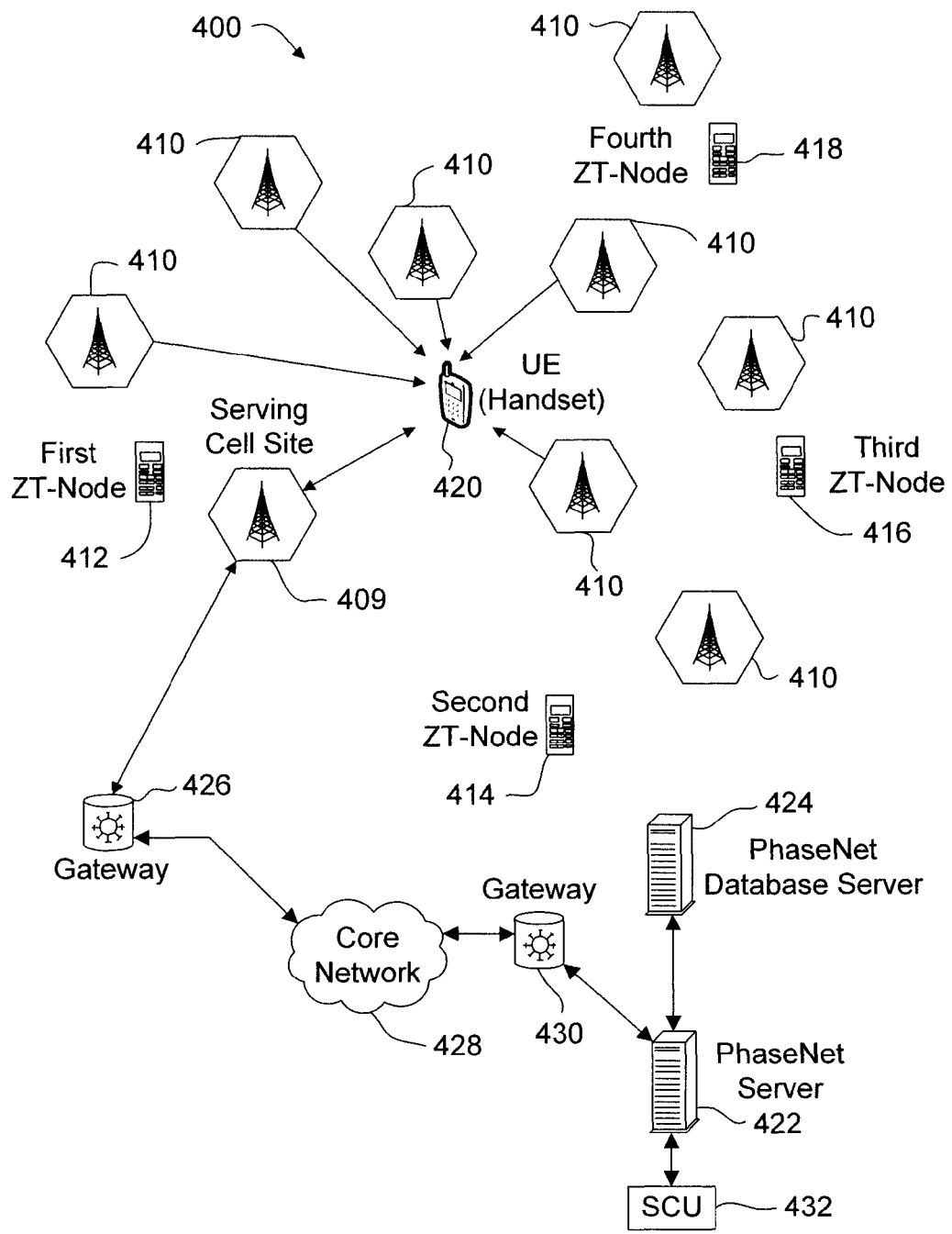
FIG. 4 is a block diagram of a cellular mobile telephone system that includes a plurality ZT nodes with ping drivers in communication with respective cell sites according to one embodiment.

FIG. 4 illustrates a block diagram of a cellular mobile telephone system 400 that includes a plurality of cell sites (nine shown), which are referred to herein as a "serving cell site" 409 and a plurality of "neighbor" cell sites 410 according to one embodiment. The cellular mobile telephone system 400 also includes a plurality of ZT nodes 412, 414, 416, 418 and a user handset 420 that are each in communication with a respective subset of the cell sites 409, 410 according to one embodiment. The cellular system 400 may also include a PhaseNet server 422 and a PhaseNet database server 424. While this example uses a single user handset 420, an artisan will recognize from the disclosure herein that any number of user handsets 420 may be supported.

As shown in FIG. 4, the user handset 420 may be in communication with the serving cell site 409 through which the user handset 420 receives cellular telephone service. The user handset 420 also receives signals from a plurality of the neighbor cell sites 410. The signals received by the user handset 420 from the serving cell site 409 and the neighbor cell sites 410 include cell site information such as cell site IDs, frequency channels, sectors, and frame synchronization information. Upon receiving a request for location information, the user handset 420 accumulates the cell site information and corresponding receive count stamps. The user handset periodically sends at least a portion of the accumulated information to the PhaseNet server 422 for processing. The ZT nodes 412, 414, 416, 418 also accumulate cell site information (from respective groups of cell sites 410) and corresponding receive count stamps. The ZT nodes 412, 414, 416, 418 also periodically send their accumulated information to the PhaseNet server 422 for processing.

As shown in FIG. 4, the PhaseNet server 422 may receive the accumulated information from the ZT nodes 412, 414, 416, 418 and the user handset 420 through a first gateway 426, a core network 428, and a second gateway 430. The PhaseNet server 422 may store the collected information in the PhaseNet database server 424. The PhaseNet server 422 includes an SCU 432 that processes the collected information to determine cell site locations and a location of the user handset 420. The PhaseNet server 422 then returns the user handset's location to the user handset 420.

An artisan will recognize from the disclosure herein that the PhaseNet server 422 and the PhaseNet database server 424 may, in certain embodiments, be combined into a single server. Further, in other embodiments, the functions performed by the PhaseNet server 422, the PhaseNet database server 424, and/or the SCU 432 may be performed by one or more of the ZT nodes 412, 414, 416, 418. For example, the SCU 432 may be located on a first ZT node 412 or distributed (e.g., using distributed networking) among a plurality of the ZT nodes 412, 414, 416, 418. In addition, or in other embodiments, the user handset 420 may include the SCU 432 and may calculate its own space-time solution using the PhaseNet algorithms based on the correlated information received from the ZT nodes 412, 414, 416, 418.

Figure 5A:
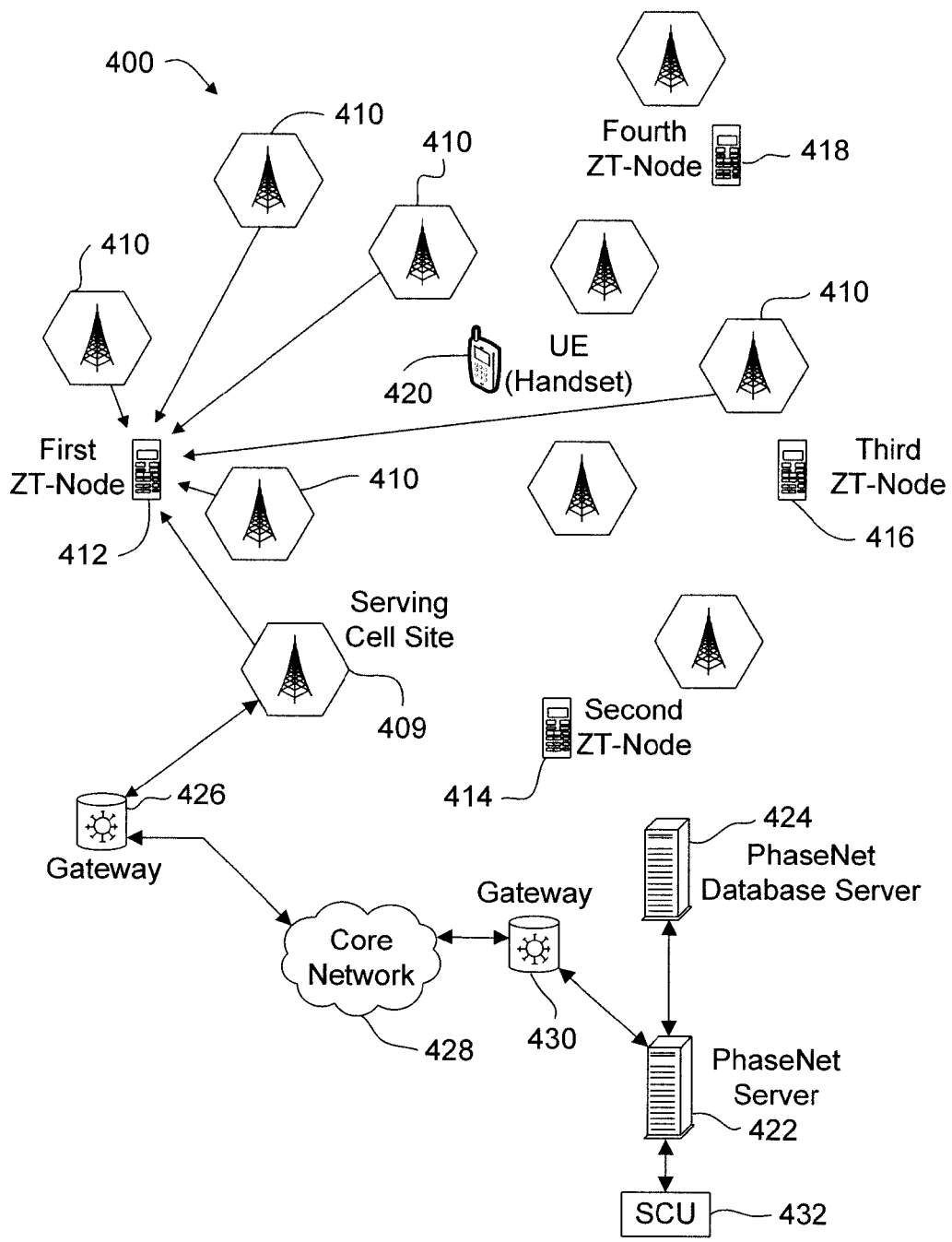
FIGS. 5A, 5B, and 5C are block diagrams graphically illustrating ZT node communications according to certain embodiments.
Figure 5B:
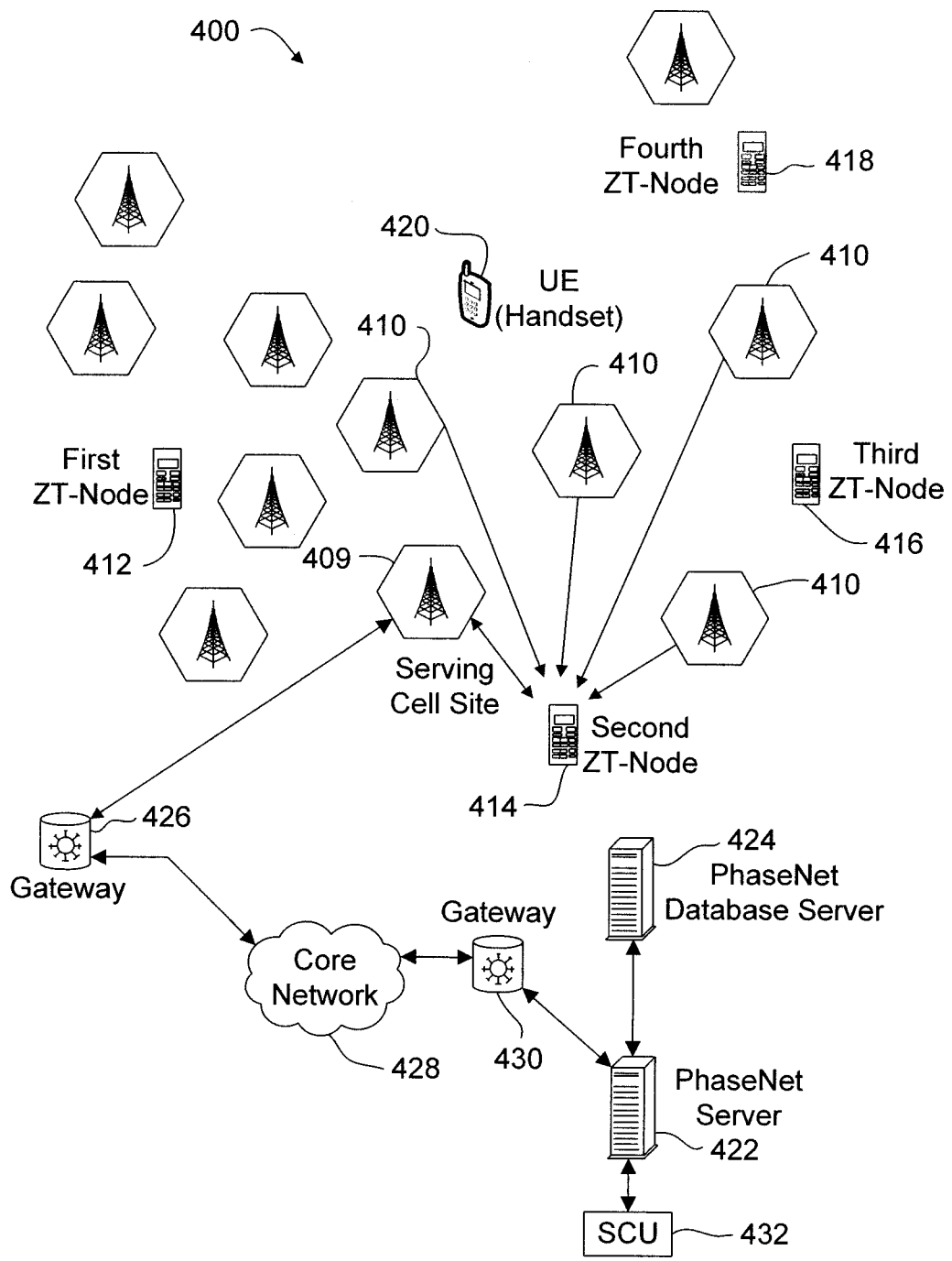
Figure 5C:
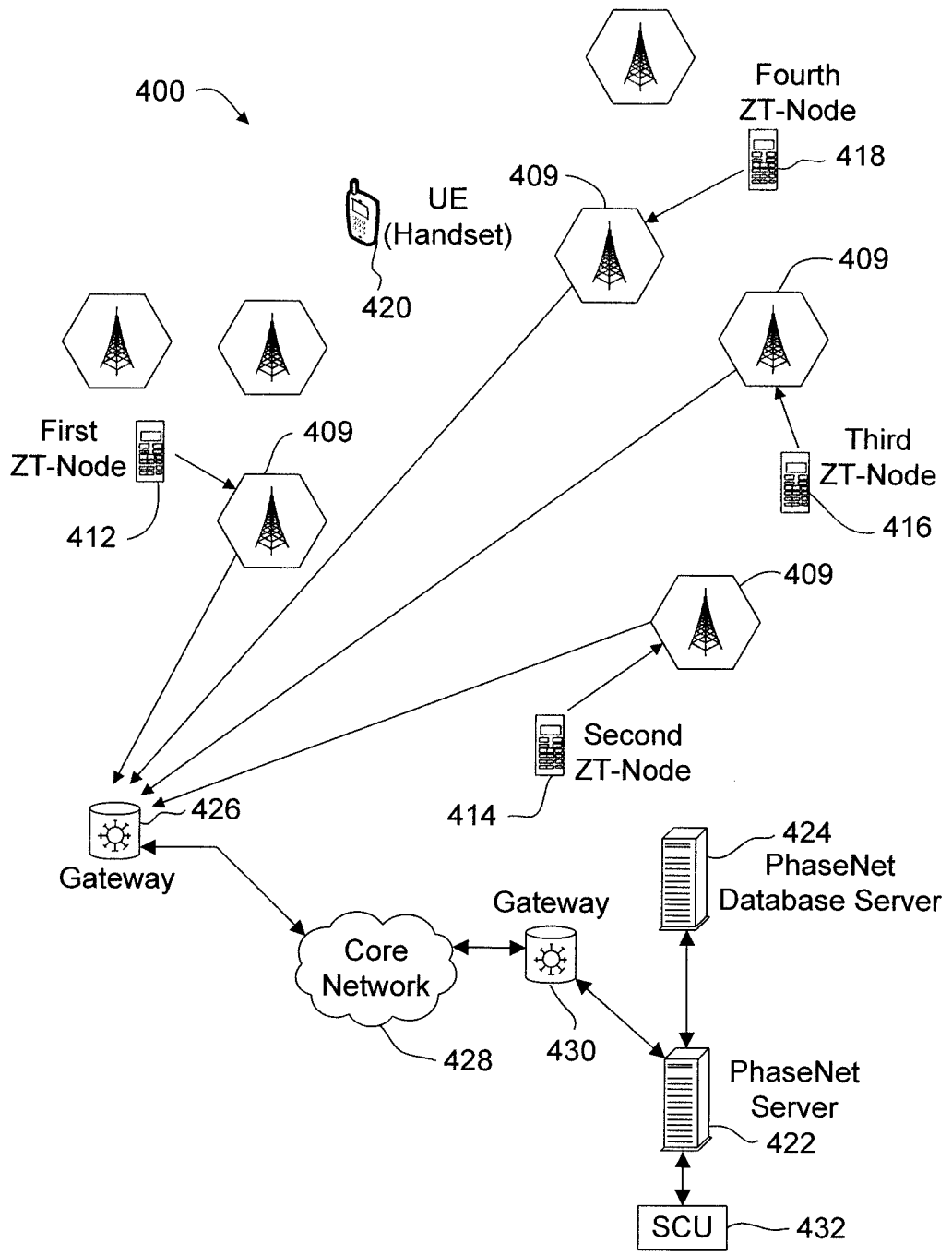

The ZT nodes 412, 414, 416, 418 constantly monitor the cellular system 400 and track any changes in frequency, sector, or cell sites 410. Each of the ZT nodes 412, 414, 416, 418 is in wireless communication with a respective subset of the cell site nodes 410 in the cellular system 400. For example, FIG. 5A illustrates a first ZT node 412 in the cellular system 400 that receives signals from a first subset of cell sites 410 and FIG. 5B illustrates a second ZT node 414 in the cellular system 400 that receives signals from a second subset of cell sites 410 according to certain embodiments. As shown in FIG. 5C, after the ZT nodes 412, 414, 416, 418 extract the cell site information from the received signals, the ZT nodes 412, 414, 416, 418 send the cell site information and associated receive count stamps to the PhaseNet server 422 through respective serving cell sites 409. Note that the first subset shown in FIG. 5A and the second subset shown in FIG. 5B are not mutually exclusive. In other words, a particular cell site 410 may be included in two or more different subsets corresponding to different ZT nodes 412, 414, 416, 418. Further, for illustrative purposes, different numbers of cell sites 410 are shown in FIGS. 5A, 5B, and 5C.

When a ZT node 412, 414, 416, 418 is added to the cellular system 400, or at other times, the particular ZT node 412, 414, 416, 418 stores information such as its latitude, longitude, elevation above mean sea level (AMSL), antenna height above ground level (AGL), cable length, cable loss, antenna type, mobile telephone number, street address, and street address of a person or persons responsible for maintaining the particular ZT node 412, 414, 416, 418.

To reduce the number of ZT nodes 412, 414, 416, 418 in the cellular system 400, each ZT node 412, 414, 416, 418 receives and processes signals from both servicing and neighbor cell sites 409, 410. In certain embodiments, approximately 20 to 60 ZT nodes 412, 414, 416, 418 are included in the system 400 for every 200 square miles. An artisan will recognize from the disclosure herein that the number of ZT nodes used in any particular system may be substantially less than 20 and substantially more than 60, depending on factors such as the terrain and system capacity. As mentioned above, in embodiments that include carrier support, the ZT nodes 412, 414, 416, 418 may be part of a cell site 409, 410 and have access to the cell site's clock information.

The user handset 420 and each of the ZT nodes 412, 414, 416, 418 may include, for example, a mobile phone (e.g., cellular handset), a laptop computer or handheld device with a wireless data card (e.g., a UMTS wireless device), or other types of user equipment (UE) capable of communicating with the cell site 410. As discussed in detail below, the user handset 420 and the ZT nodes 412, 414, 416, 418 are modified from conventional UE devices with software modules and/or hardware components that provide, among other things, pseudo communications between devices in the cellular system 400. In certain embodiments, the ZT nodes 412, 414, 416, 418 include ruggedized user equipment (handsets) installed in known stationary locations and are configured to constantly monitor the cellular system 400 for changes and frame synchronization information. In other embodiments, one or more of the ZT nodes 412, 414, 416, 418 may be mobile, as long as its current location is accurately known (e.g., provided by an accurate GPS device).

Figures 6A, 6B:
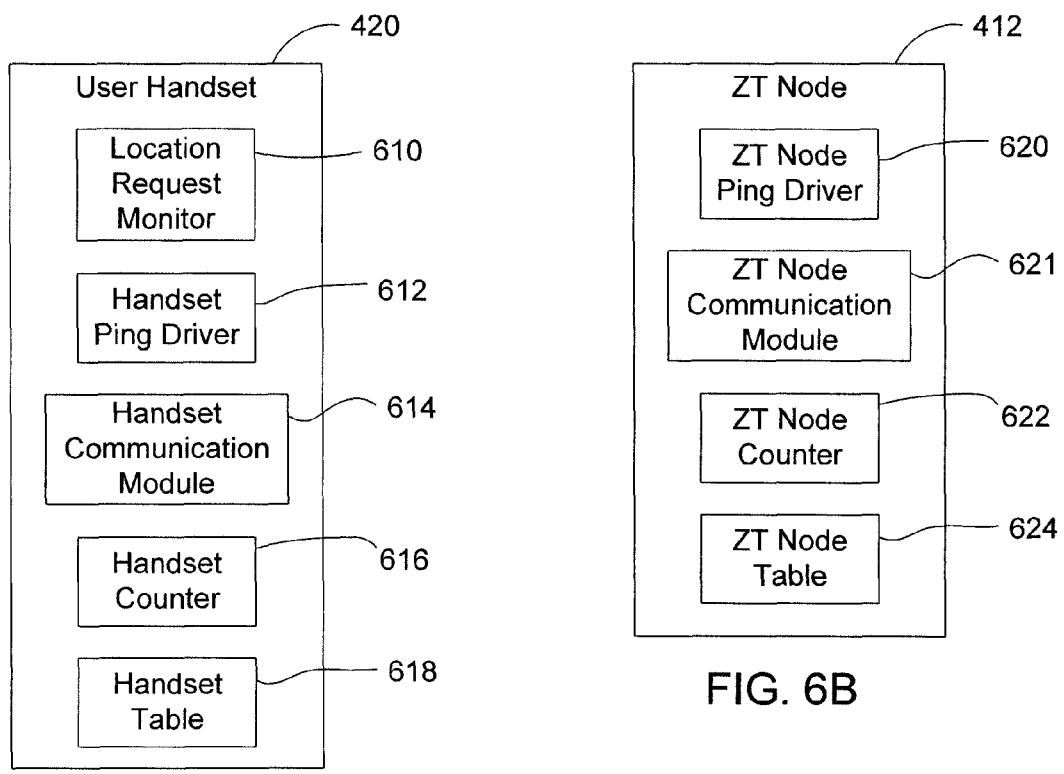
FIG. 6A is a block diagram of an example user handset according to one embodiment.
FIG. 6B is a block diagram of an example ZT node according to one embodiment.

FIG. 6A is a block diagram of an example user handset 420 according to one embodiment. The user handset 400 includes a location request monitor 610, a handset ping driver 612, a handset communication module 614, a handset counter 616, and a handset table 618. The location request monitor 610 determines whether a request for location information has been received. The request may be made directly (e.g., a user enters a location request into the user handset 420) or indirectly (e.g., a user dials 911). In response to the request for location information, the location request monitor 610 activates the handset ping driver 612. The handset ping driver 612 collects cell site information (including frame synchronization information) from its serving cell site 409 and neighbor cell sites 410, correlates the frame synchronization information with receive count stamps based on values provided by the handset counter 616 as the frame synchronization information is received, and stores the information in the handset table 618 (discussed below). The handset communication module 614 then sends the handset table 618 (or an updated portion thereof) to the PhaseNet server 422. In other embodiments, the user handset 420 reduces memory requirements by directly streaming the accumulated information to the PhaseNet server 422 without storing it in the handset table 618.

FIG. 6B is a block diagram of an example ZT node 412 according to one embodiment. The ZT node 412 shown in FIG. 6B may be used for the ZT nodes 412, 414, 416, 418 shown in FIG. 4. Like the user handset 420, the ZT node 412 includes a ZT node ping driver 620, a ZT node communication module 621, a ZT node counter 622, and a ZT node table 624. However, rather than activating the ZT node ping driver 620 in response to a request for location information, the ZT node 412 constantly accumulates cell site information and corresponding receive count stamps (based on the ZT node counter 622) that it periodically provides to the PhaseNet server 422 through the ZT node communication module 621. In one embodiment, for example, the ZT node communication module 621 provides the information to the PhaseNet server 422 approximately every 20 milliseconds. In other embodiments, however, the ZT node communication module 621 provides the information only when requested to do so by the PhaseNet server 422. In addition, or in other embodiments, the ZT node communication module 621 is configured to change a domain name server to a perspective customer's domain name server for access.

When the ZT node 412 is initiated, the ZT node communication module 621 may automatically contact the PhaseNet server 422. If there is a subsequent communication outage, the ZT node communication module 621 reconnects to the PhaseNet server 422 and provides the PhaseNet server 422 with any updates that occurred during the outage. Upon reconnection, for example, the ZT node communication module 621 may exchange information with the PhaseNet database server 424 to determine whether any cell site information needs to be updated.

FIG. 7 graphically represents an example ZT node table 624 according to one embodiment. This example corresponds to a UMTS/WCDMA 3G system and the values in the ZT node table 624 are provided by way of example only, and not by limitation. Further, while FIG. 7 provides an example of the ZT node table 624 shown in FIG. 6B, a similar handset table 616 may be provided by the user handset 420 shown in FIG. 6A. In this example, the ZT node table 624 includes a first column 710 with cell ID numbers, a second column 712 with corresponding frequency or sector data, a third column 714 with corresponding transmit (TX) frame adjustment information, a fourth column 716 with corresponding SFN-SFN values, a fifth column 718 with corresponding ZT node counter values, a sixth column 720 with corresponding SFN values, a seventh column 722 with corresponding ZT node clock result values, and an eighth column 724 with corresponding transmit/receive (TX-RX) delay values. As discussed below, the columns 710, 712, 714, 716, 718, 720, 722, 724 are populated with data received or derived from the corresponding cell sites 410 and the ZT node counter 622.

The cell ID values in the first column 710 are unique identifiers for the serving cells 409 and neighbor cells 410. The cell ID values are associated with the corresponding frequency or sector information in the second column 712 to uniquely identify each received signal.

The SFN values in the sixth column 720 correspond to frames sent simultaneously from all cell sites 409, 410. In one embodiment, for example, the SFN values start at 0, end at 4095, and are sent approximately every 20 ms (every other SFN). The SFN-SFN values (SFN minus SFN) in the fourth column 716 are provided by a counter in the ZT node 412 (or the user handset 420) that subtracts the neighbor cell sites' SFN times from the serving cell site's SFN time. In this example, a cell site with a cell ID value of CA-316 is the serving cell site for the ZT node 412. Accordingly, the SFN-SFN value corresponding to this cell ID value is zero.

As shown, the serving cell site may also be associated with a corresponding TX frame adjustment value (in the third column 714) and a corresponding TX-RX delay value (in the eighth column 724) used for removing errors from the space-time calculations. The ZT node counter values in the fifth column 718 are provided by the ZT node counter 622 as packets with corresponding SFN values are received. The ZT node clock result values in the seventh column 722 are each a combination of the ZT clock counter values and the corresponding SFN values.

Not every embodiment includes each of the above values in the ZT node table 624 (or the handset table 618). In addition, or in other embodiments, other values may be included in the tables 618, 624. For example, in a UMTS/WCDMA system, the tables 618, 624 may include: a round trip time (RTT) (e.g., between the serving cell site 409 and the user handset 420 or the ZT node 412); quality of service (QOS) or quality parameter, which is an optional parameter related to the quality of the signal between the serving cell site 409 and the user handset 420; received signal strength indication (RSSI), which is an optional parameter that indicates the power present in a received radio signal; and pre-predictive time, which is an optional parameter corresponding to the time that a transmit chip is pushed forward of the receive chips to match the serving cell 409. In a GSM system, the tables 618, 624 may include, for example: QN, BN, and FN counters from system frame synchronization; and time advance TA parameters for both the serving cell 409 and the neighbor cells 410.

Figure 8:
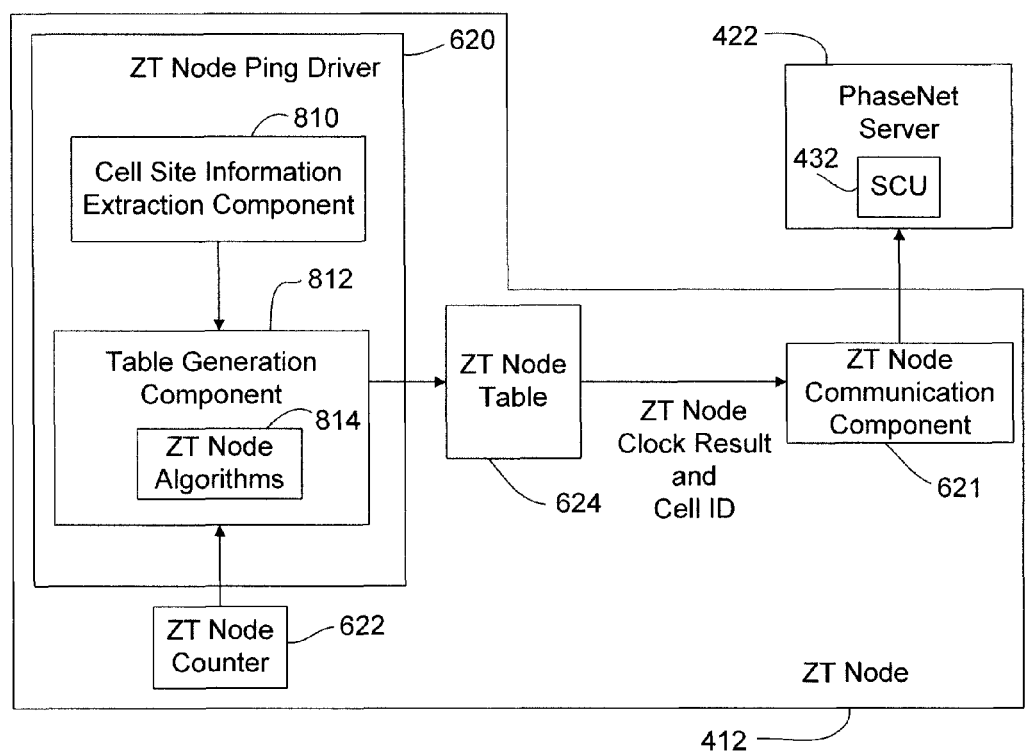
FIG. 8 is a block diagram illustrating the accumulation of system data according to one embodiment.

FIG. 8 is a block diagram illustrating the accumulation of system data according to one embodiment. As shown in FIG. 8, the ZT node ping driver 620 may include a cell site information extraction component 810 and a table generation component 812. As frames are received from the various cell sites 409, 410, the cell site information extraction component 810 extracts frame synchronization information (e.g., such as SFN and/or SFN-SFN information) from each frame and provides the extracted information to the table generation component 812. The cell site information extraction component 810 also provides other information to the table generation component 812 such as cell ID values, frequency/sector values, or other cell site parameters discussed above. The table generation component 812 generates receive count stamps, using values from the ZT node counter 622, for each received frame and associates the receive count stamps to the appropriate SFN and/or SFN-SFN values. In one embodiment, the table generation component 812 includes ZT node algorithms 814 that the table generation component 812 uses to generate the ZT node clock result.

Thus, for each packet received from a plurality of cell sites, the table generation component 812 constructs the ZT node table 624 discussed above. In some embodiments, the table generation component 812 sorts the extracted data by SFN value. In the ZT node table 624 shown in FIG. 7, for example, packets received from five different cell sites (with cell IDs of CA-316, OR-110, CA-415, OR-111, and CA-4316) each have an SFN value of 224. After grouping the received packets by SFN value, the ZT node communication module 621 sends the ZT node table 624 (or an updated portion thereof) to the PhaseNet server 422 for processing by the SCU 432. The table generation component 812 may then update the ZT node table 624 with data related to another set of five packets from the same five cell sites for another SFN value (e.g., 226).

In certain embodiments, after the ZT node 412 has stabilized, the ZT node communication module 621 sends a reduced amount of data to the PhaseNet server 422. For example, the ZT node communication module 621 may send the ZT node clock result provided by the ZT node algorithms 814 and the corresponding cell ID values provided by the ZT node counter 622. The ZT node communication module 621 may also send any other values in the ZT node table 624 that changed since the previous transmission. In one embodiment, the communication module 621 transmits less than approximately 5 kbytes/second.

In one embodiment, the PhaseNet database server 424 includes database node tables and database cell site tables. FIG. 9 schematically illustrates a database node table 900 according to one embodiment. In this example, the database node table 900 includes a first column 910 for ZT node numbers that uniquely identify each of the ZT nodes 412, 414, 416, 418, a second column 912 for respective ZT node latitudes (Lat), a third column 914 for respective ZT node longitudes (Long), a fourth column 916 for respective ZT node AMSL values, a fifth column 918 for respective ZT node antenna (Ant) AGL values, a sixth column 920 for respective ZT node cable delays (e.g., delay between an antenna port and the antenna) (Cab Dely), a seventh column 922 for respective ZT node street addresses, an eighth column 924 for respective ZT node contact information (e.g., phone number, contact names, hours), a ninth column 926 for respective neighbor cell ID numbers, and a tenth column 928 for respective ZT node correlation values (ZTmodCor). As shown in FIG. 9, the ninth column 926 and the tenth column 928 may each be repeated for a plurality of neighbor cell sites (for a predetermined number of "best neighbors") and corresponding ZTmodCor values.

An artisan will recognize from the disclosure herein that the database node table 900 may include other parameters (e.g., international mobile equipment identity (IMEI) values of the respective ZT nodes, respective ZT node antenna cable lengths, and/or respective ZT node antenna types), and that not all parameters shown in FIG. 9 may be included in every embodiment. For example, in some embodiments, calculations may only use one or more of the latitude, longitude AMSL, AGL, Cab Dely, and/or ZTmodCor values. In some embodiments, the ZT nodes 412, 414, 416, 418 automatically determine and provide the information to the database node table 900. In other embodiments, a user may manually input the values into the database node table 900 as the ZT nodes 412, 414, 416, 418 are installed into the system 400.

FIG. 10 schematically illustrates a cell site table 1000 according to one embodiment. The cell site table 1000 provides a frame of reference or additional offsets to the ZT nodes 412, 414, 416, 418 for space-time calculations, but may not be directly used in the space-time calculations discussed below. In this example, the cell site table 1000 includes a first column 1010 for sector ID numbers that respectively identify the corresponding cell site sectors, a second column 1012 for respective cell site latitudes, a third column 1013 for respective cell site longitudes, a fourth column 1014 for respective cell site AGL values, a fifth column 1016 for respective cell site AMSL values, a sixth column 1018 for respective cell site cable delay, a seventh column 1020 for respective cell site numbers, an eighth column 1022 for respective cell site QOS/RSSI values, and a ninth column 1024 for flags (e.g., "Y" for yes or "N" for no) that indicate changes to respective cell sites.

As discussed below, in one embodiment, the PhaseNet server 422 determines and automatically provides at least some of the values in the cell site table 1000. In addition, or in other embodiments, a plurality of the cell sites 409, 410 are audited to determine the accuracy of the values in the cell site table 1000. For example, measured values for cable delay, latitude, longitude, AGL, and/or AMSL may be manually entered into cell site table 1000 based on the audit.

Figure 11:
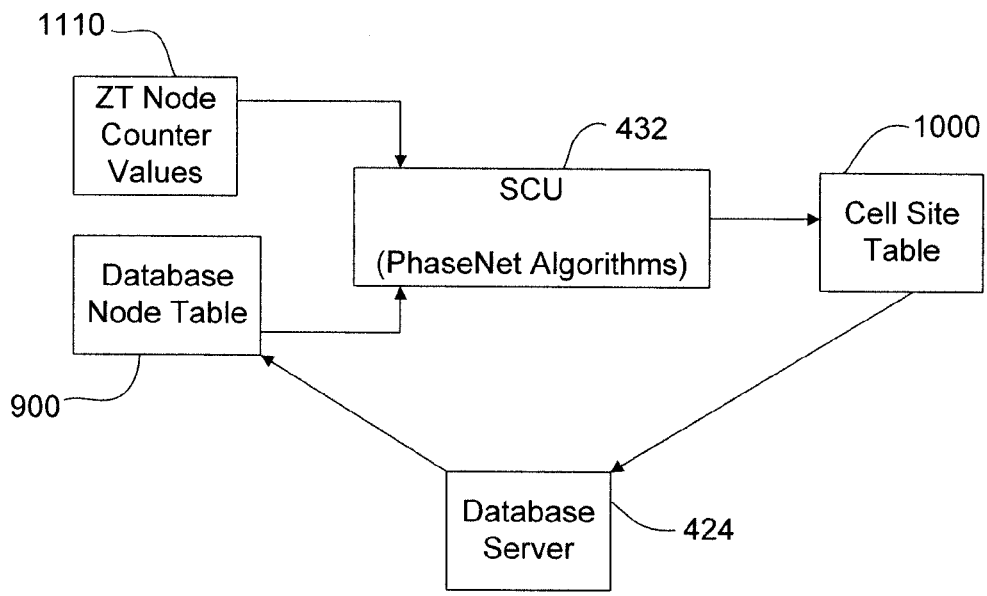
FIG. 11 is a block diagram illustrating the development of a cell site table according to one embodiment.

FIG. 11 is a block diagram illustrating the development of the cell site table 1000 by the SCU 432 according to one embodiment. As discussed above, the SCU 432 determines the locations of the cell sites 409, 410. To determine the locations of the cell sites 409, 410, the PhaseNet server 422 provides ZT node counter values 1110 (accumulated from the ZT node ping drivers 620) and the database node table 900 to the SCU 432. The SCU 432 uses the ZT node counter values 1110 and the data from the database node table 900 as inputs to the PhaseNet algorithms (discussed below). The SCU 432 uses the PhaseNet algorithms to determine the locations of the cell sites 409, 410 (e.g., latitude, longitude, AGL, and/or AMSL) and stores the cell site location information in the cell site table 1000. In one embodiment, the PhaseNet server 422 reads the database node table 900 from the database server 424 and stores the cell site table 1000 in the database server 424.

After the locations of the cell sites 409, 410 are known, the ZT node ping drivers 620 continue sending at least the ZT node clock result and corresponding cell ID values to the SCU 432 to aid in the calculation of the user handset's location. Upon request for location information from the user handset 420, the SCU 432 uses the cell site table 1000 to correlate receive count stamps generated by the user handset 420 with the receive count stamps generated by the ZT node ping drivers 620.

Figure 12:
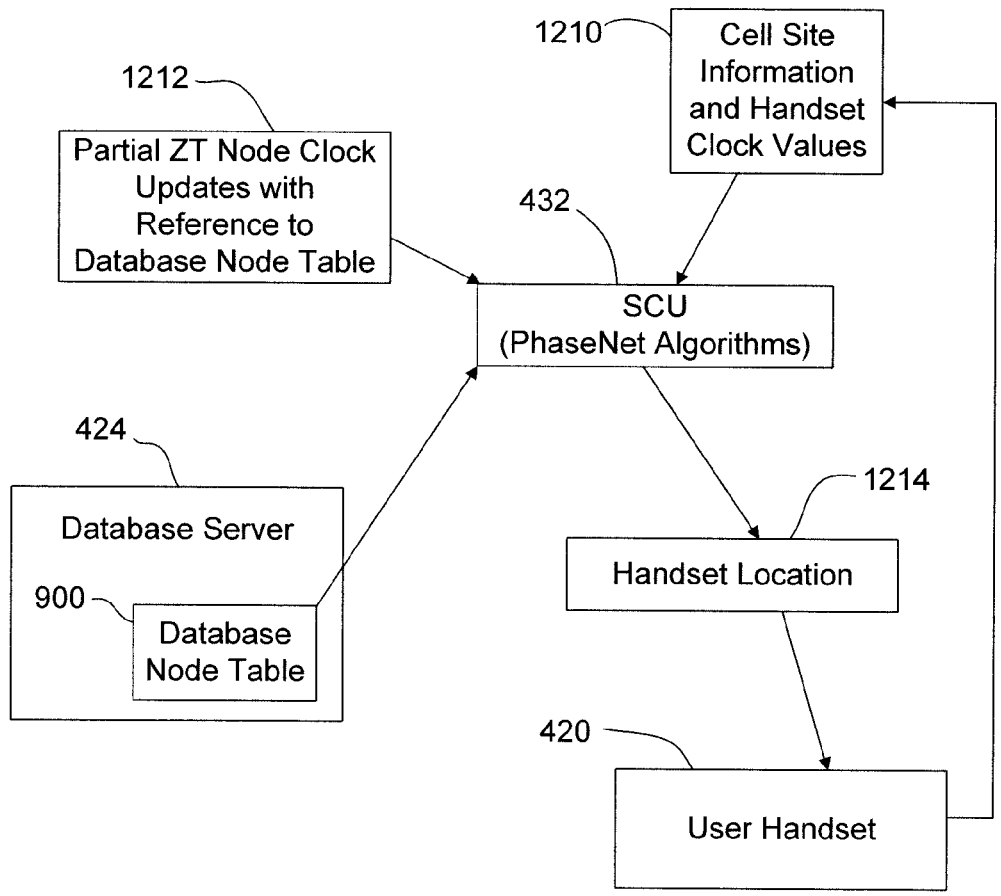
FIG. 12 is a block diagram illustrating the development of location information for the user handset according to one embodiment.

FIG. 12 is a block diagram illustrating the development of location information for the user handset 420 according to one embodiment. After the user handset 420 receives a request 1210 for location information, the user handset 420 activates its handset ping driver 612 and provides accumulated cell site information and handset clock values 1210 to the SCU 432. The SCU 432 also receives the database node table 900 from the database server 424 and partial ZT node clock updates 1212 with references to the database node table 900 from the ZT node ping drivers 620. The SCU 432 sorts the received information and provides the sorted information as inputs to PhaseNet algorithms. The SCU 432 uses the PhaseNet algorithms to produce a user handset location 1214. The user handset location may include, for example, the latitude, the longitude, and at least one of the AGL and the AMSL of the user handset 420. The SCU 432 then provides the user handset location 1214 to the user handset 420.

The SCU 432 sorts the received information based at least in part on the particular cell sites 409, 410 that are in communication with both the user handset 420 and the ZT nodes 412, 414, 416, 418. In one embodiment, for example, the SCU 432 generates a cell site list based on the cell site information received from the user handset 420. The cell site list includes the serving cell site 409 and neighbor cell sites 410 that are in communication with the user handset 420. The SCU 432 then determines a subset of the ZT nodes 412, 414, 416, 418 that are in communication with the listed cell sites 409, 410.

Figures 13A, 13B, 14:
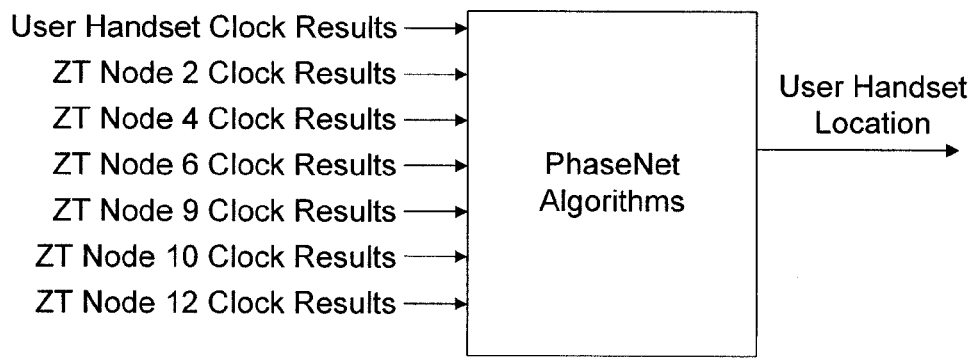
FIG. 13A graphically illustrates a cell site list generated according to one embodiment.
FIG. 13B graphically illustrates a ZT node list generated according to one embodiment.
FIG. 14 is a block diagram of clock result inputs to PhaseNet algorithms according one embodiment.

For example, FIG. 13A graphically illustrates a cell site list 1310 generated according to one embodiment. The cell site list 1310 indicates that the user handset 420 accumulates cell site information from serving cell 10 and neighbor cells 11, 12, 13, 15, 20. Based on the cell site list 1310, the SCU 432 generates the ZT node list 1312 graphically illustrated in FIG. 13B. The ZT node list 1312 includes at least one ZT node for each of the cells in the cell site list 1310. In this example, as shown in FIG. 13B, the ZT node list 1312 includes ZT Node 4 that accumulates cell site information from serving cell 10, ZT Node 2 that accumulates cell site information from neighbor cell 11, ZT Node 6 that accumulates cell site information from neighbor cell 12, ZT Node 10 that accumulates cell site information from neighbor cell 13, ZT Node 9 that accumulates cell site information from neighbor cell 15, and ZT Node 12 that accumulates cell site information from neighbor cell 20.

The SCU 432 then provides the clock results from the user handset 420 and the subset of ZT nodes in the ZT node list 1312 as inputs to the PhaseNet algorithms. For example, FIG. 14 is a block diagram of the clock result inputs to the PhaseNet algorithms according to the example embodiment of FIGS. 13A and 13B. As shown in FIG. 14, the user handset clock results, ZT node 2 clock results, ZT node 4 clock results, ZT node 6 clock results, ZT node 9 clock results, ZT node 10 clock results, and ZT node 12 clock results are provided as inputs to the PhaseNet algorithms. As discussed above, the respective clock results each include respective combinations of frame synchronization information and receive count stamps. The PhaseNet algorithms, which are discussed in detail below, generate a user handset location based on differences between the input clock results (e.g., for a respective SFN value), the locations of the cell sites in the cell site list 1310, and the locations of the ZT nodes in the ZT node list 1312.

Figure 15:
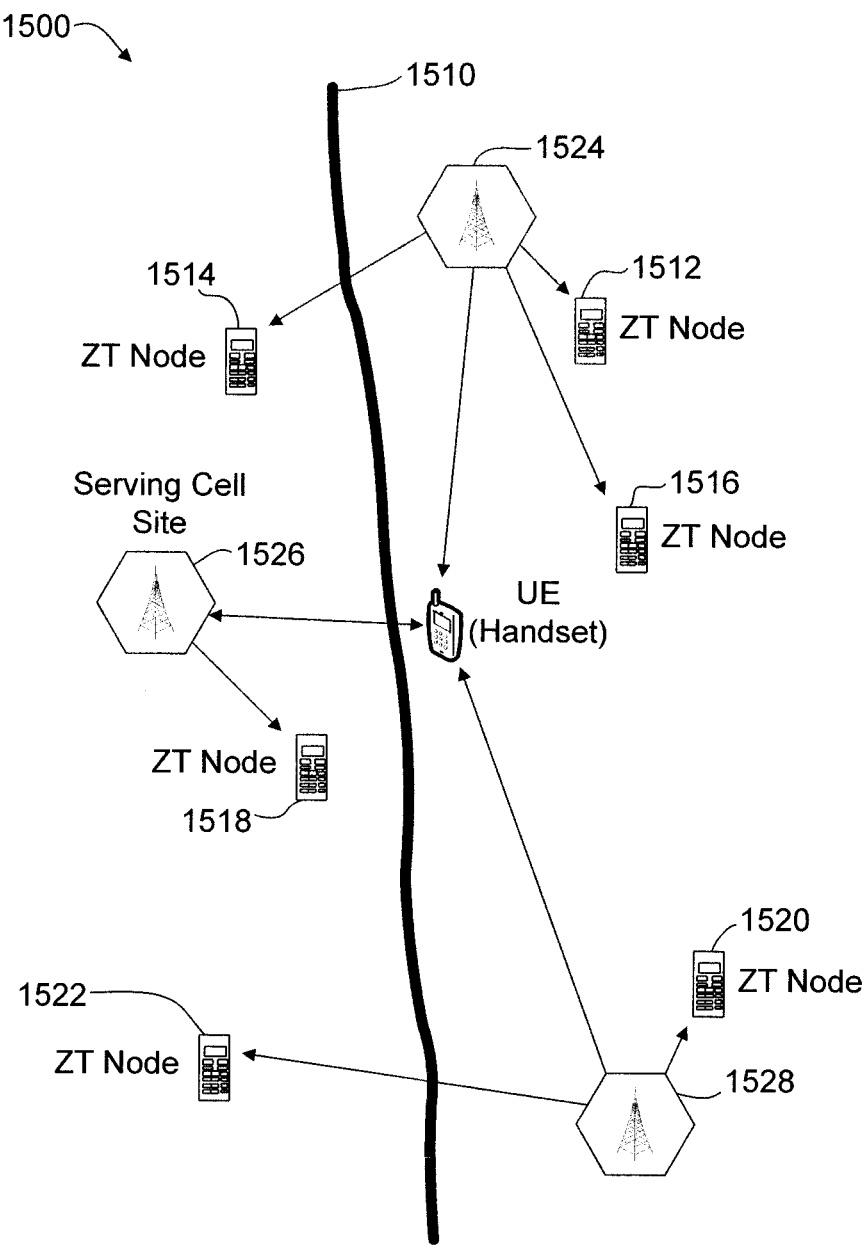
FIG. 15 is a schematic diagram illustrating a cellular system for locating a user handset along a rural highway according to one embodiment.

The embodiments disclosed herein may be used to locate user handsets 420 in highly populated urban settings or sparsely populated rural settings. For example, FIG. 15 is a schematic diagram illustrating a cellular system 1500 for locating a user handset 1508 along a rural highway 1510 according to one embodiment. The cellular system 1500 includes a plurality of ZT nodes 1512, 1514, 1516, 1518, 1520, 1522 distributed along the rural highway 1510 so as to be in communication with respective cell sites 1524, 1526, 1528. In certain such embodiments, for example, approximately six to ten ZT nodes may be located along a 35 mile stretch of the rural highway 1510 such that each ZT node is in communication with approximately three of the cell sites.

In the example embodiment shown in FIG. 15, the center cell site 1526 is currently acting as the serving cell for the user handset 1508 as the user handset 1508 travels along the rural highway 1510. The upper cell site 1524 and the lower cell site 1528 are currently serving as neighbor cells. Because the user handset 1508 receives signals from each of the cell sites 1524, 1526, 1528, ZT node clock results are accumulated from each of the ZT nodes 1512, 1514, 1516, 1518, 1520, 1522 in communication with the three cell sites 1524, 1526, 1528 and are used as inputs to the PhaseNet algorithms to determine the location of the user handset 1508.

C. The PhaseNet Algorithms

The method used by the PhaseNet algorithms to determine the locations of nodes is pseudo lateration. In lateration, the distances (or differences of distances) between nodes, derived by time-of-flight measurements, are used to solve for positions of nodes. However, the PhaseNet algorithms invoke lateration as but one element of a more sophisticated structure. This is because PhaseNet synthesizes both timing and position information for each node of the network. These two elements, timing and position, are intertwined.

To determine the positions of the nodes of a network using pure lateration implies accurate timing information is available to make time-of-flight measurements. Conversely, to synchronize the clocks within a network by passing synchronization messages between nodes requires that node positions are known, so that time-of-flight delays may be subtracted out. The PhaseNet algorithms handle the linked nature of time and space by solving for both elements simultaneously.

In the most general case, the PhaseNet algorithms start with free-running clocks on each network node and, from these, synthesize a common network time and a relative location solution for the network. Before the PhaseNet algorithms are run, there may not be pre-existing timing relationship between nodes, and no concept of what a "network time" might be. The free-running counters are used to time stamp messages passed between nodes, and the resulting time stamps are then processed by the algorithms.

The PhaseNet algorithms are used to determine ranges and coarse direction vectors between nodes in the network. Thus, relative positions between the nodes may be determined. Subscripted K values may be used herein to account for direction between nodes. For example, the entity $k_{XYZ\_AB} = \{k_X, k_Y, k_Z\}$ may be referred to herein as the "coarse direction vector" existing between node A and node B, and the scalar components $k_X$, $k_Y$, and $k_Z$ may be referred to herein as "direction cosines" divided by c (the speed of light) of the coarse direction vector. The word "coarse" is used because strict direction is only asymptotically defined, and yet direction can be utilized nevertheless. In its strictest form, the coarse direction vector is simply the starting estimate on a convergence sequence, but for all practical purposes, a small percent error in the direction vectors is trivial compared to error analysis. One of the roles for the coarse direction vectors is to establish a Cartesian coordinate system such that motion can be resolved into orthogonal components that make sense to both the transmitting node and the receiving node (and eventually the entire set of nodes). In some embodiments, initial direction vectors may be used based on the last known relative positions of the sending and receiving nodes.

Figure 16:
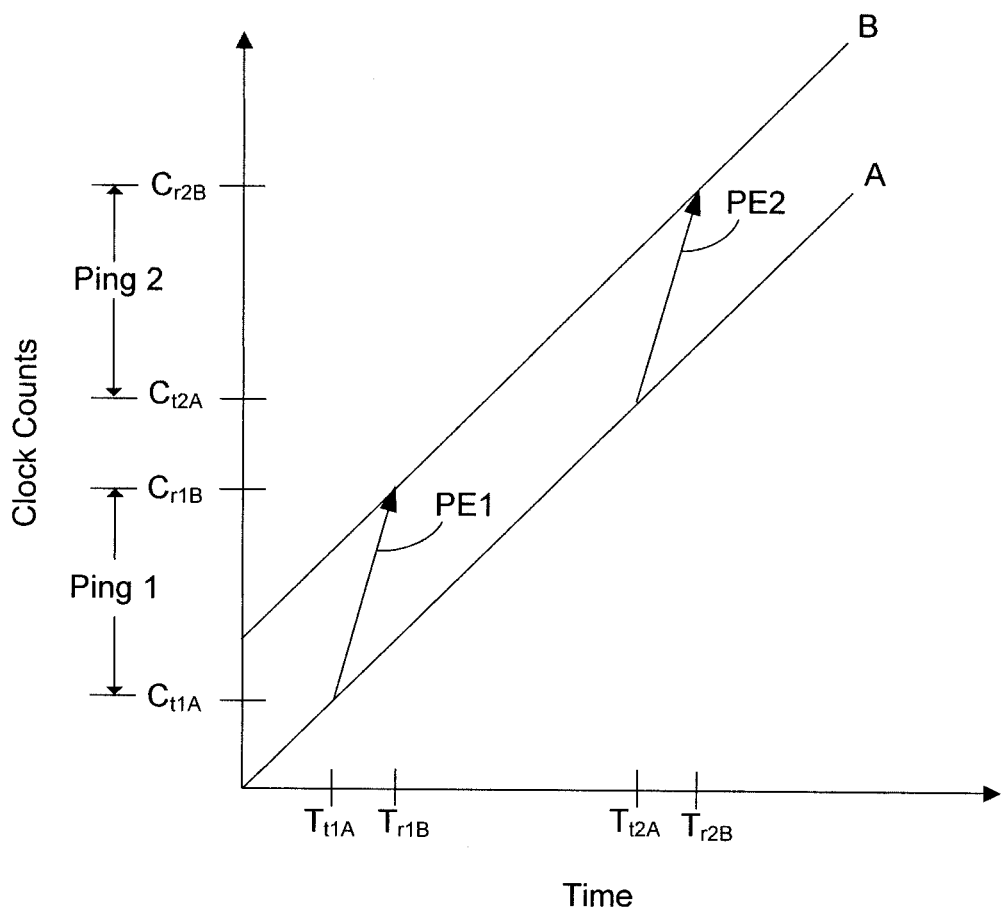
FIG. 16 is a graph showing clock counts corresponding to two time-displaced ping events transmitted from a first node and received by a second node under conditions in which the nodes are the same distance apart from each other during the two ping events.

FIG. 16 is a graph showing clock counts corresponding to two time-displaced ping events transmitted from node A and received by node B under conditions in which nodes A and B are the same distance apart from each other during two ping events. With reference to FIG. 16, a vector PE1 represents a first ping event, which has a clock count value, Ping 1, expressed as $$\text{Ping } 1 = C_{r1B} - C_{t1A}, \tag{1}$$

where $C_{t1A}$ is a clock count (or count stamp) accumulated by a counter (e.g., counter 214 shown in FIG. 2) driven by a digital clock residing at node A and transmitted by node A at a time, $T_{t1A}$, and $C_{r1B}$ is a clock count (or count stamp) accumulated by a counter driven by a digital clock residing at node B and associated with a time, $T_{r1B}$, at which node B receives the first ping event transmitted by node A at $T_{t1A}$. A vector PE2 represents a second, later ping event, which has a clock count value, Ping 2, expressed as $$\text{Ping } 2 = C_{r2B} - C_{t2A}, \tag{2}$$

where $C_{t2A}$ is the clock count transmitted by node A at a time, $T_{t2A}$, and $C_{r2B}$ is the clock count associated with a time, $T_{r2B}$, at which node B receives the second ping event transmitted by node A at $T_{t2A}$. The straight line (ignoring incremental count quantization) plot of clock counts as a function of time for each of nodes A and B indicate that their respective digital clocks, $CLK_A$ and $CLK_B$, operate at the same or a "system nominal" rate.

A differential clock count value representing the difference between Ping 2 and Ping 1, $\Delta \text{Ping}_{AB}$, can be expressed as $$\Delta Ping_{AB} = Ping2 - Ping1 \tag{3}$$
$$= (C_{r2B} - C_{t2A}) - (C_{r1B} - C_{t1A}).$$

The entity $\Delta \text{Ping}_{AB}=0$ when nodes A and B are the same distance apart from (i.e., not moving relative to) each other at the times of ping events PE1 and PE2. This is the situation represented in FIG. 16, in which $(T_{r1B}-T_{t1A})$ and $(T_{r2B}-T_{t2A})$ are equal.

Figure 17:
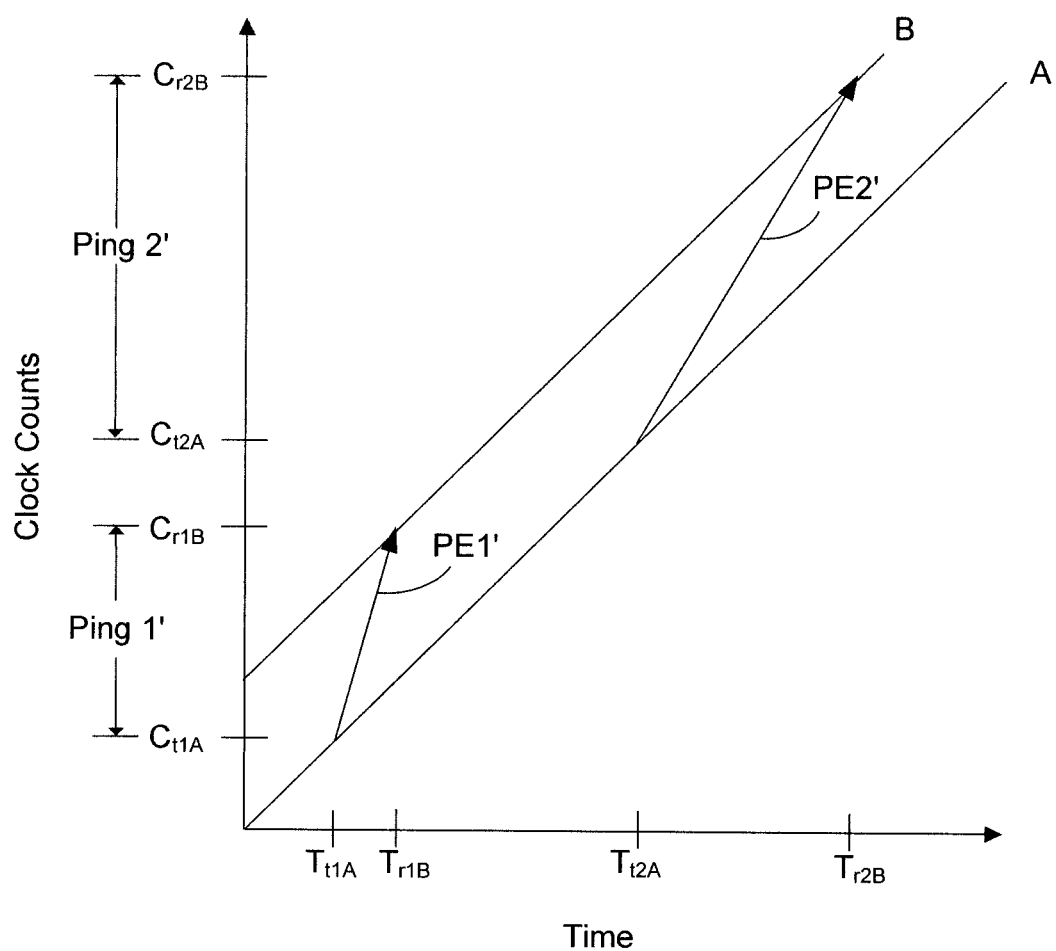
FIG. 17 is a graph showing clock counts corresponding to two time-displaced ping events transmitted from a first node and received by a second node under conditions in which the nodes are different distances apart from each other during the two ping events.

FIG. 17 is a graph showing clock counts corresponding to two time-displaced ping events transmitted from node A and received by node B under conditions in which nodes A and B are different distances apart from each other during the two ping events. With reference to FIG. 17, a vector PE1' represents a first ping event having a Ping 1' value that is the same as the Ping 1 value of vector PE1. A vector PE2' represents a second, later ping event having a Ping 2' value that is greater than the Ping 2 value of vector PE2. A change in distance between nodes A and B for the first and second ping events is expressed as $\Delta \text{Dist}_{AB}$. The inequalities $\Delta \text{Ping}_{AB}>0$ and $\Delta \text{Dist}_{AB}>0$ indicate that nodes A and B moved farther apart from each other between the times of the first and second ping events, as represented in FIG. 17. Similarly, the inequalities $\Delta \text{Ping}_{AB}<0$ and $\Delta \text{Dist}_{AB}<0$ indicate that nodes A and B moved closer to each other between the times of the first and second ping events.

Figure 18:
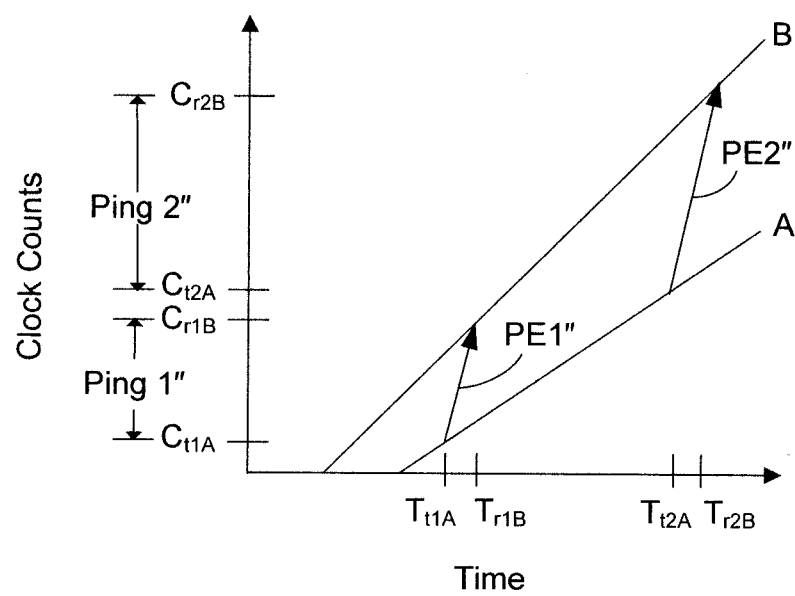
FIG. 18 is a graph showing clock counts corresponding to two time-displaced ping events transmitted from a first node and received by a second node under conditions in which the nodes are the same distance apart from each other during the two ping events but their clock rates are dissimilar.

FIG. 18 is a graph showing clock counts corresponding to two time-displaced ping events transmitted from node A and received by node B under conditions in which nodes A and B are the same distance apart from each other during the two ping events but their clock rates are dissimilar. With reference to FIG. 18, $(T_{r1B}-T_{t1A})$ and $(T_{r2B}-T_{t2A})$ are equal; therefore, nodes A and B are not moving relative to each other at the times of the first and second ping events PE1" and PE2". The clock count plots of nodes A and B indicate that they are not parallel and that the node A clock, $CLK_A$, counts at a slower rate than the count rate of the node B clock, $CLK_B$. FIG. 18 indicates that when the clock rate of $CLK_A$ decreases relative to the system nominal rate, Ping 2" increases relative to Ping 2 of FIG. 16. In general, the following relationships characterize in ping counts changes in rate of node clock A, $\Delta CLK_A$, and node clock B, $\Delta CLK_B$:

$\Delta CLK_A$ decreases $\Rightarrow \Delta \text{Ping}_{AB}$ increases $\Delta CLK_B$ decreases $\Rightarrow \Delta \text{Ping}_{AB}$ decreases.

The following two equations express, in terms of ping counts, changes in the distance between nodes A and B, assuming that ping events are also transmitted from node B and received and count stamped by node A:

$$\Delta \text{Ping}_{AB} = K_1 \Delta \text{Dist}_{AB} - K_2 \Delta CLK_A + K_3 \Delta CLK_B \tag{4}$$

$$\Delta \text{Ping}_{BA} = K_1 \Delta \text{Dist}_{BA} + K_2 \Delta CLK_B - K_3 \Delta CLK_A. \tag{5}$$

Figure 19:
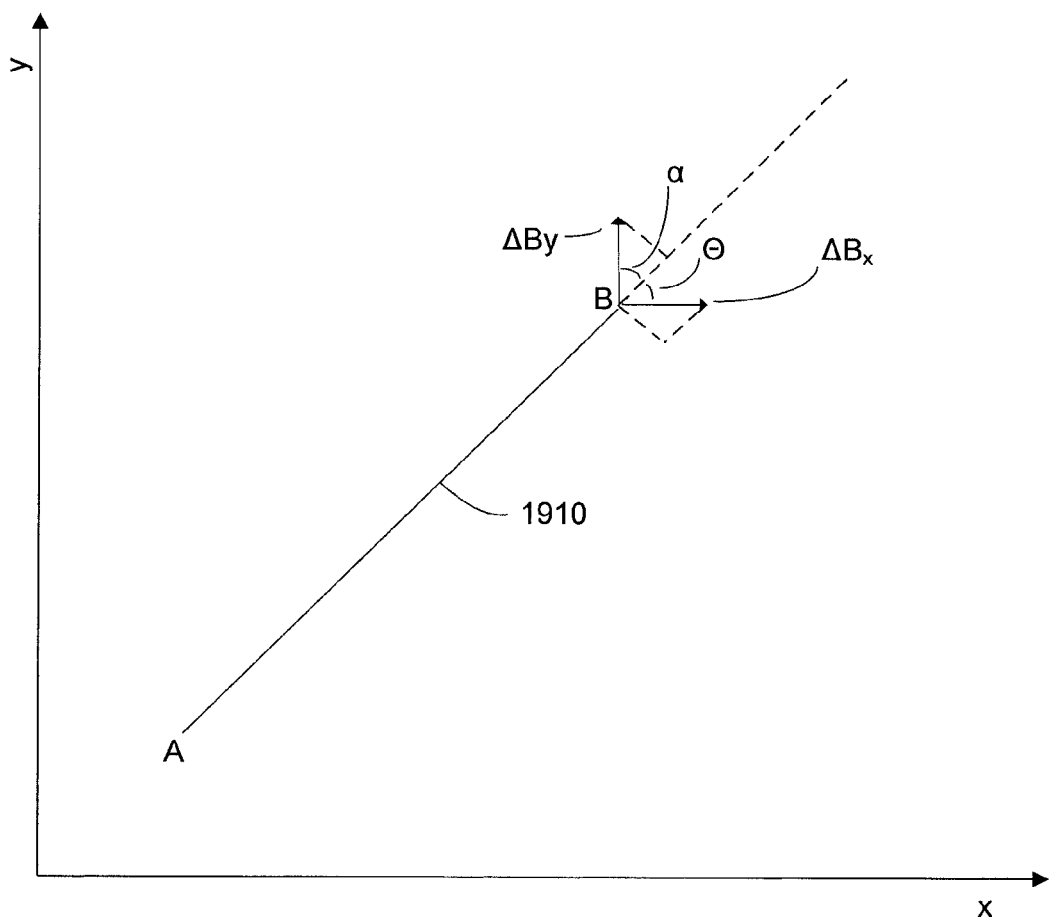
FIG. 19 is a diagram for use in illustrating the calculation of a change in distance between the first and second nodes.

FIG. 19 is a diagram for use in illustrating the calculation of $\Delta \text{Dist}_{AB}$. For small displacements during a unit ping interval (i.e., during a short interval between successive pings), the term $$\Delta \text{Dist}_{AB} = \sqrt{\Delta X_{AB}^2 + \Delta Y_{AB}^2 + \Delta Z_{AB}^2} \tag{6}$$

can be approximated. FIG. 19 is a diagram showing a straight line path segment between nodes A and B. With reference to FIG. 19, a straight line 1910 connecting nodes A and B represents in x, y coordinate space the displacement of node B relative to node A for two successive ping events. FIG. 19 shows that, for short time intervals between successive ping events and when node A remains stationary, the x and y components of $\Delta \text{Dist}_{AB}$ at node B can be expressed as $\Delta B_x \cos \theta$ and $\Delta B_y \cos \alpha$, respectively, where $\Delta B_x$ and $\Delta B_y$ are the changes in the respective x and y coordinates of node B from its receipt of Ping 1 to its receipt of Ping 2, $\theta$ is the angle between line 1910 and its projection onto the x axis, and a is the angle between line 1910 and its projection onto the y axis. Similarly, in x, y, z coordinate space, the z component of $\Delta \text{Dist}_{AB}$ can be expressed as $\Delta B_z \cos \phi$.

When the three components are combined and the coordinates of node A are included, $\Delta \text{Dist}_{AB}$ can be expressed as $$\Delta Dist_{AB} = \tag{7}$$
$$\Delta B_x \cos\theta + \Delta B_y \cos\alpha + \Delta B_z \cos\varphi - [\Delta A_x \cos\theta + \Delta A_y \cos\alpha + \Delta A_z \cos\varphi].$$

Substituting into equation (4) the expression for $\Delta \text{Dist}_{AB}$ in equation (7) and taking into account the speed of light, c, for the E-M implementation provides $$\Delta Ping_{AB} = \Delta B_x\left(\frac{\cos\theta}{c}\right) + \Delta B_y\left(\frac{\cos\alpha}{c}\right) + \Delta B_z\left(\frac{\cos\varphi}{c}\right) + \Delta A_x\left(\frac{-\cos\theta}{c}\right) + \tag{8}$$
$$\Delta A_y\left(\frac{-\cos\alpha}{c}\right) + \Delta A_z\left(\frac{-\cos\varphi}{c}\right) - K_2\Delta CLK_A + K_3\Delta CLK_B.$$

Simplifying equation (8) by relabeling the constant coefficients of the terms of $\Delta \text{Dist}_{AB}$, $$\Delta \text{Ping}_{AB} = \Delta A_X K_{AX} + \Delta B_X K_{BX} + \Delta A_Y K_{AY} + \Delta B_Y K_{BY} + \Delta A_Z K_{AZ} + \Delta B_Z K_{BZ} - K_2 \Delta CLK_A + K_3 \Delta CLK_B. \tag{9}$$

Figure 20:
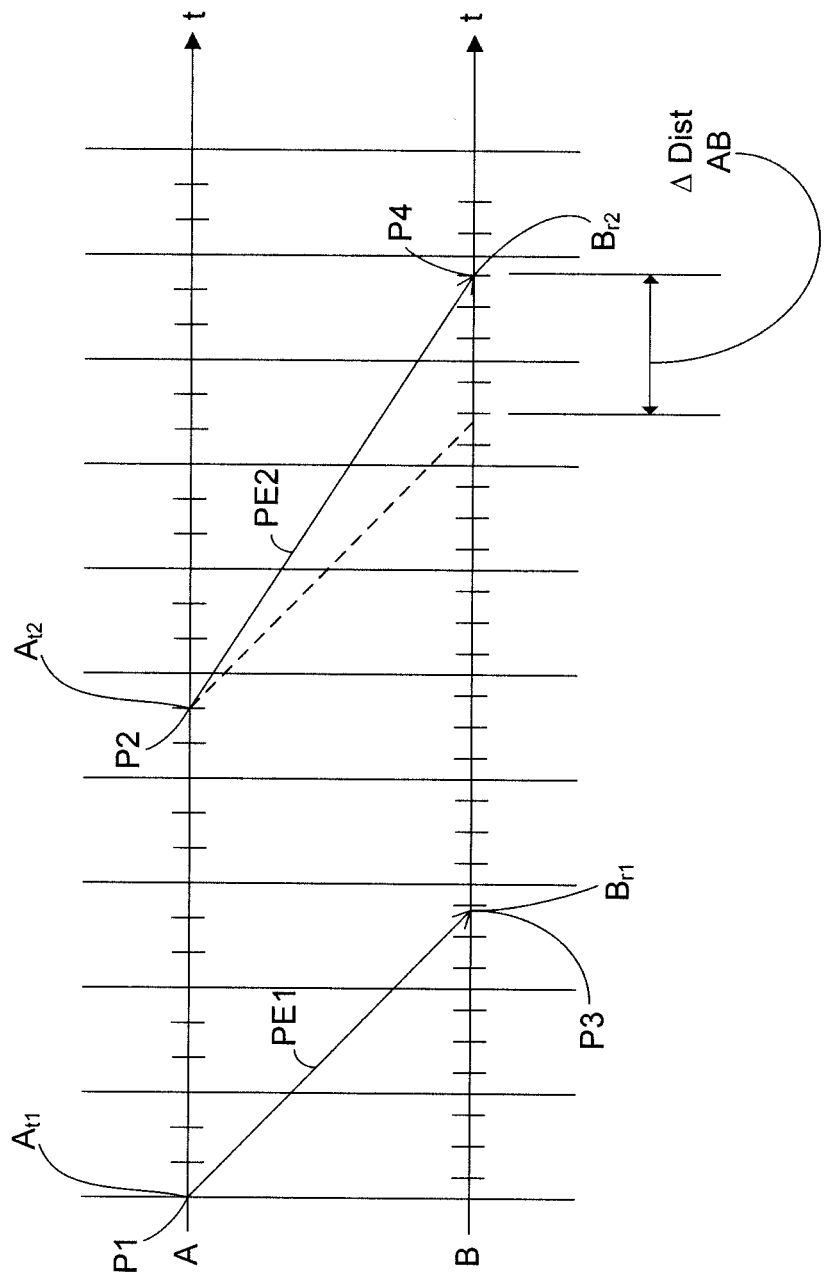
FIG. 20 is a diagram showing two timelines of ping events transmitted by the first node and received by the second node for calculating changes in rates of the clocks of the first and second nodes.

The solution of the $\Delta CLK_A$ and $\Delta CLK_B$ terms is developed with reference to FIG. 20. In FIG. 20, the horizontal line A represents a timeline of ping events transmitted by node A, and the horizontal line B represents a timeline of the ping events received by node B. The vertical lines intersecting horizontal lines A and B are mutually spaced apart by a unit time interval, which represents the period of the system nominal clock rate. The shorter-length tick marks on lines A and B indicate the actual clock rates of $CLK_A$ and $CLK_B$, respectively. A vector PE1 represents a first ping event transmitted by a node A at a time $A_{t1}$ established by $CLK_A$ and received by node B at a time $B_{r2}$ established by $CLK_B$. A vector PE2 represents a second ping event transmitted by node A at a later time $A_{t2}$ established by $CLK_A$ and received by node B at a time $B_{r2}$ established by $CLK_B$. Transmit times $A_{t1}$ and $A_{t2}$ define respective time points $P_1$ and $P_2$, and receive times $B_{r1}$ and $B_{r2}$ define respective time points $P_3$ and $P_4$. Inspection of FIG. 20 reveals that $$\overline{P_1P_2} + \overline{P_2P_4} = \overline{P_1P_3} + \overline{P_3P_4}. \tag{10}$$

The term $\overline{P_1P_2}$ represents the time interval, measured in system nominal time, between the transmission of PE1 and the transmission of PE2. Similarly, the term $\overline{P_3P_4}$ represents the system nominal time interval between the reception times for these ping events. The terms $\overline{P_2P_3}$ and $\overline{P_1P_3}$ represent the system nominal time intervals between, respectively, the transmission and the reception of PE2 and PE1. More specifically, with reference to FIG. 16, $$\overline{P_1P_2} = (C_{t2A} - C_{t1A}) - \Delta CLK_{A12} \tag{11}$$

$$\overline{P_3P_4} = (C_{r2B} - C_{r1B}) - \Delta CLK_{B12}, \tag{12}$$

where $\Delta CLK_{A12}$ and $\Delta CLK_{B12}$ represent the number of clock ticks needed to correct to the system nominal clock rate for, respectively, $CLK_A$ from the transmission time of first ping event PE1 to the transmission time of second ping event PE2 and for $CLK_B$ from the receive time of PE1 to the receive time of PE2. Moreover, with reference to FIG. 20, $$\overline{P_1P_3} = \frac{Dist_{1AB}}{c} \tag{13}$$

and $$\overline{P_2P_4} = \frac{Dist_{2AB}}{c}, \tag{14}$$

where $Dist_{1AB}$ represents for the first ping event, PE1, the distance between nodes A and B from the transmit time recorded at node A to the receive time recorded at node B, and $Dist_{2AB}$ represents for the second ping event, PE2, the distance between nodes A and B from the transmit time recorded at node A to the receive time recorded at node B. Thus, equation (6) also can be expressed as $$\frac{\Delta Dist_{AB}}{c} = \frac{Dist_{2AB}}{c} - \frac{Dist_{1AB}}{c}. \tag{15}$$

Substituting into equation (10) the right-hand side terms of equations (11), (12), (13), and (14) provides the following expression $$(C_{t2A} - C_{t1A}) - \Delta CLK_{A12} + \frac{Dist_{2AB}}{c} = \tag{16}$$

$$\frac{Dist_{1AB}}{c} + (C_{r2B} - C_{r1B}) - \Delta CLK_{B12}.$$

Rearranging the terms of equation (10) provides $$-\Delta CLK_{A12} + \frac{Dist_{2AB}}{c} = \tag{17}$$

$$\frac{Dist_{1AB}}{c} + (C_{r2B} - C_{t2A} - C_{r1B} + C_{t1A}) - \Delta CLK_{B12}.$$

Substituting into equation (17) the left-hand side terms of equations (3) and (15) results in the following expression $$\Delta Ping_{AB} = \frac{\Delta Dist_{AB}}{c} + \Delta CLK_{B12} - \Delta CLK_{A12}, \tag{18}$$

where $\Delta CLK_{B12}$ and $\Delta CLK_{A12}$ represent corrections to, respectively, $CLK_B$ and $CLK_A$ to comport with the system nominal clock rate.

Equation (18) is in the form of the equation to which matrix algebra is applied to solve for the unknown displacement values and changes in clock rates. The matrix equation is expressed as $$g = Hf, \tag{19}$$

where g is a column vector of $\Delta$ Pings, the number of which is the number of ping events minus 1; H is a two-dimensional matrix of coefficients constructed from the ping events; and f is a column vector of unknowns that include changes in clock rate and location changes in x, y, and z displacements.

Referring again to the example of ten nodes A, B, C, D, E, F, G, H, I, J shown in FIG. 1, each node listens to and records the other nine nodes' ping transmit events, yielding 9×10 or 90 pings that are then recorded. Thus, in one embodiment, the g vector is organized in groups of 90, corresponding to roughly synchronous ping events of the 45 duplex channels existing among the ten nodes.

In another embodiment, PhaseNet organizes the g vector in short snippets of information of a size equal to the length of a "harmonic block." In the example embodiment shown in FIG. 1, for example, this length is defined as 10 milliseconds or nominally 10 ping epochs for any given node. Many PhaseNet implementations may choose between 5 and 100 fundamental ping epochs per harmonic block, being a trade-off between, on the one hand, flexibility in dealing with different sampling rates on the chosen metrics, and on the other hand, inverting very large matrices. As computing resources continue to improve, the choice will slowly move beyond "100", as the pressure to worry about the size of matrices and the speed of inversions lessens.

The computation of equation (19) is carried out in certain embodiments using harmonic blocks, in which there is a selected number of harmonic blocks for each equation and selected numbers of clock solutions and location solutions for each harmonic block. The number of system nodes can change (above a certain minimum number of nodes), depending on whether certain nodes remain in the system.

Before equation (19) is solved, all of the ping information is accumulated by at least one node in the network. Each node uses a pung broadcasting schedule according to certain embodiments to transmit to other nodes in the network the ping information the node has received. By combining ping events and pungs that have been received, a node is able to reconstruct information for all of the ping events of the network.

In the example embodiment shown in FIG. 1, an entire harmonic block's worth of accumulated ping information is sent to a node's communication device 216 (see FIG. 2) for broadcast as a pung packet to all other nodes. Nodes receiving this pung-packet message (from at least one harmonic block time in the past) store the received pung data along with its own accumulated ping information. In this example, the pung data packet includes nine other nodes' received ping data. This configuration in which all participating nodes share all information is a baseline solution example, such that any node can create a full set-wide solution. Other embodiments may designate special nodes that capture all the pung packet data and thus have the full information set necessary to calculate set-wide solutions.

In the example embodiment shown in FIG. 1, a pung structure associated with one harmonic block should have 81 other-node ping information×10 ping events per block×2 bytes per ping data point or 1,620 bytes of information if no down-sampling or compression is used. This amounts to 18,000 bytes of pung information per channel per second, which may exceed the communication channel's capacity. In certain embodiments, only 3,600 bytes of accumulated ping data per second are stored, thus limiting the data transfer rate to 10 Kbps. Thus, in certain embodiments, PhaseNet reduces "Pung Overhead," the communications demand for the pung channel, to only a small percentage of a given channel's data carrying capacity. At the very least, the pung data rate is preferably below the channel capacity. Certain embodiments compress the pung data using standard algorithms known to those skilled in the art to reduce the burden on the communication channel.

D. Example Application of the PhaseNet Algorithms in a Cellular System

As discussed above, the PhaseNet algorithms may be applied to systems that generate ping events from count stamped messages exchanged directly between nodes. In certain cellular system embodiments discussed herein, however, frame synchronization information is transmitted (e.g., in pings) from a plurality of cell sites and is received by a plurality of ZT nodes and one or more user handsets. Thus, the PhaseNet algorithms discussed above are adapted for pings that are only transmitted by the cell sites rather than pings that are transmitted by each type of node in the network (e.g., there may be no ZT node to ZT node communication or ZT node to user handset communication). The cell sites are assumed to be synchronized with one another such that their respective clocks drift with respect to one another by approximately tens of microseconds. Thus, the cell sites are assumed to be transmitting pings or frame synchronization information at approximately the same time. As discussed in the following example, the PhaseNet algorithms discussed above may be used to determine the synchronization between the cell sites to thereby determine ranges between the cells sites and the ZT nodes and user handsets.

The positioning and synchronization algorithms discussed herein solve systems of linear equations, which are easier to solve than systems of nonlinear equations. To derive systems of equations that are linear, the network is linearized about a presumed current state using coarse direction vectors, as discussed above. In this example embodiment, it is assumed that the locations of the cell sites are approximately known and that the locations of the ZT nodes are precisely known. Thus, the coarse direction vectors may be determined between a particular cell site and a plurality of ZT nodes that receive synchronization information from the particular cell site.

Figure 21:
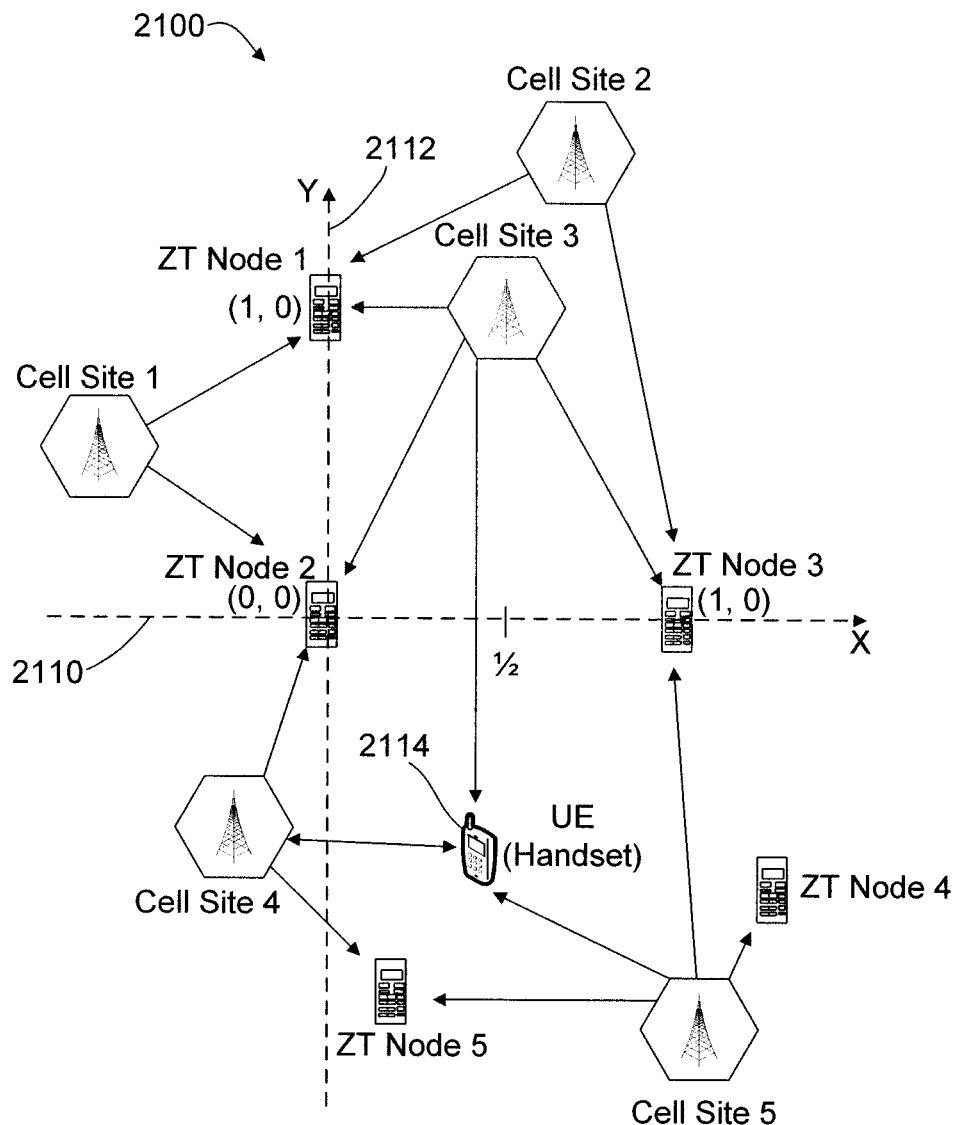
FIG. 21 is a schematic diagram illustrating an example cellular system for locating a user handset according to one embodiment.

FIG. 21 is a schematic diagram illustrating an example cellular system 2100 for locating a user handset according to one embodiment. For illustrative purposes, the cellular system 2100 is shown with respect to an X-axis 2110 and a Y-axis 2112 of a two dimensional coordinate system. An artisan will recognize from the disclosure herein that this example embodiment may be extended to three dimensions for determination of relative antenna heights or altitudes. In this example, the cellular system 2100 includes cell site 1, cell site 2, cell site 3, cell site 4, and cell site 5. The cellular system 2100 also includes ZT node 1, ZT node 2, ZT node 3, ZT node 4, ZT node 5, and a user handset 2114.

The cell sites transmit an n-th ping (e.g., corresponding to an n-th frame) with frame synchronization information at respective transmit times $T_s[n]$, where the subscript S is the cell site that transmitted the ping. Thus, for example, cell site 1 transmits ping n at time $T_1[n]$ and cell site 2 transmits ping n at time $T_2[n]$. Similarly, the ZT nodes receive the n-th pings at respective receive times $R_{ZS}[n]$, where the subscript Z is the ZT node that received the ping and the subscript S is the cell site that transmitted the ping. For example, ZT node 1 receives the n-th ping from cell site 1 at receive time $R_{11}[n]$ and ZT node 1 receives the n-th ping from cell site 2 at receive time $R_{12}[n]$. Thus, the difference in time between the reception, at ZT node 1, of the n-th ping from cell site 1 and cell site 2 may be expressed as $$R_{11}[n]-R_{12}[n]. \quad (20)$$

One contribution to the time difference expressed in equation (20) is the synchronization between cell site 1 and cell site 2. As discussed above, there may be some drift between the transmit times $T_1[n]$ and $T_2[n]$. The synchronization difference between cell site 1 and cell site 2 may be expressed as $$E_{12}[n]=T_1[n]-T_2[n]. \quad (21)$$

Another contribution to the time difference expressed in equation (20) is the difference between a first approximate distance from ZT node 1 to cell site 1 (referred to as $D_{11}$) and a second approximate distance from ZT node 1 to cell site 2 (referred to as $D_{12}$). Thus, equation (20) may be written as $$R_{11}[n]-R_{12}[n]=E_{12}[n]+(D_{11}-D_{12}). \quad (22)$$

Because the locations of cell site 1 and cell site 2 are assumed to be approximately known, there will be errors (in X, Y, and Z directions) in the distance terms $D_{11}$ and $D_{12}$. For ZT node 1 and cell site 1, course direction vectors may be calculated. If we move away from cell site 1, we can determine the effect on the corresponding change in the distance relative to the estimated distance $D_{11}$. If the distance change is positive, then the change appears on the right side of equation (22) with a positive sign. If the error is such that it increases the distance between cell site 1 and cell site 2, then the change appears on the right side of equation (22) with a negative sign. To account for the distance errors, a summation may be added to the right side of equation (22) as shown in equation (23) below:

$$R_{11}[n]-R_{12}[n]=E_{12}[n]+(D_{11}-D_{12})+\sum_{i=x,y,z}(\delta_{1i}V_{11i}-\delta_{2i}V_{12i}), \quad (23)$$

where i is a summation variable over X, Y, or Z, $\delta_{1i}$ is an error in the estimated position of cell site 1, $\delta_{2i}$ is an error in the estimated position of cell site 2, $V_{11i}$ is a coarse direction vector component between ZT node 1 and cell site 1, and $V_{12i}$ is a coarse direction vector component between ZT node 1 and cell site 2. Equation (23) may be rewritten as $$(R_{11}[n] - R_{12}[n]) + (D_{12} - D_{11}) = E_{12}[n] + \sum_{i=x,y,z} (\delta_{1i} V_{11i} - \delta_{2i} V_{12i}), \quad (24)$$

which corresponds to a single row equation that may be applied to the g=Hf matrix equation (19) discussed above. The left side of equation (24) corresponds to one element of the g column vector and the right side corresponds to a combination of unknowns in the f column vector and coefficients in the H matrix. In particular, $E_{12}[n]$, $\delta_{1i}$, and $\delta_{2i}$ are unknown elements of the f vector, and $V_{11i}$ and $V_{12i}$ are elements of the H matrix. Equation (24) is repeated for each combination pair of cell sites (e.g., cell sites 1 and 2, 1 and 3, 2 and 3, . . . ) from which the ZT nodes receive the n-th ping (or n-th frame). An artisan will understand from the disclosure herein that solutions corresponding to multiple frames may be averaged to arrive at a final solution.

There are seven unknowns in equation (24), namely $E_{12}[n]$, $\delta_{1x}$, $\delta_{1y}$, $\delta_{1z}$, $\delta_{2x}$, $\delta_{2y}$, and $\delta_{2z}$. Thus, a sufficient number p of ZT nodes are needed to arrive at a solution. If there are q number of cell sites in communication with each ZT node, then the number of equations needed may be represented as $$\text{Number of equations} = \frac{pq(q-1)}{2}. \quad (25)$$

It can be shown that there are 4(q) unknowns. Thus, to determine the sufficient number p of ZT nodes for the solution, equation (25) may be rewritten as $$\frac{pq(q-1)}{2} > 4(q). \quad (26)$$

Solving equation (26) for p gives $$p > \frac{8(q)}{q-1}. \quad (27)$$

As discussed above, there are at least two situations in which the algorithms in this example may be used. A first situation is to linearize the set of equations used to determine the locations of the cell sites. Rough locations of the cell sites may be needed at first to calculate the coarse direction vectors between the ZT nodes and the cell sites. After the equations are solved and more precise locations have been found for the cell sites, these precise locations may be used in the calculation of future coarse direction vectors for later updates. Thus, the calculation of coarse direction vectors from rough position estimates is done only infrequently.

Referring again to FIG. 21, a second case in which coarse direction vectors are used is in the determination of the location of the user handset 2114, given the locations of nearby cell sites. The rough location of the user handset 2114 may be needed in certain embodiments to calculate coarse direction vectors between the cell sites and the user handset 2114. After an initial set of coarse direction vectors has been calculated from rough handset location data, future coarse direction vectors may be calculated using prior, more precise, solutions for the location of the user handset 2114. As with the rough position data for cell sites, the rough position data for user handsets 2114 need only be calculated occasionally.

In both of these cases in which rough location data may be needed, it is possible to glean rough range data from the cellular infrastructure. In the first case, ZT nodes may calculate SFNs (or other equivalent measures) that may be used to calculate the rough range between a ZT node and nearby cell sites. In the user handset 2114 case, SFNs may be calculated by the user handset 2114 to determine a rough distance to the nearby cell sites.

In addition, rough locations may be calculated for a single node having an unknown location, if data is available for the range between the unknown node and a sufficient set of nodes having known locations. Note that in the first case the node with unknown location is a cell site and the nodes of known location are ZT nodes. In the second case, the node with unknown location is a user handset 2114 and the nodes of known location may be cell sites.

Referring again to FIG. 21, for example, assume that the (X, Y) locations of ZT node 1, ZT node 2, and ZT node 3 are known with respect to the X-axis 2110 and the Y-axis 2112. As shown in FIG. 21, ZT node 1 may be located at position (0, 1), ZT node 2 may be located at position (0, 0), and ZT node 3 may be located at position (1, 0). Also assume that the location of cell site 3 is unknown.

If range data is available between cell site 3 and each of ZT node 1, ZT node 2, and ZT node 3, then the location of cell site 3 may be determined with respect to the X-axis 2110 and the Y-axis 2112. For example, if the distance between cell site 3 and ZT node 1 is known to be approximately 1/2, the distance between cell site 3 and ZT node 2 is approximately $\sqrt{5/4}$, and the distance between cell site 3 and ZT node 3 is approximately $\sqrt{5/4}$, then the following three equations may be created $$(x-0)^2+(y-1)^2=1/4, \quad (28)$$

$$(x-0)^2+(y-0)^2=5/4, \text{ and} \quad (29)$$

$$(x-1)^2+(y-0)^2=5/4. \quad (30)$$

Expanding equations (28), (29), and (30) gives $$x^2+y^2-2y+1=1/4, \quad (31)$$

$$x^2+y^2=5/4, \text{ and} \quad (32)$$

$$x^2-2x+1+y^2=5/4. \quad (33)$$

Taking the difference of equations (32) and (33), and solving for x gives x=1/2. Substituting this value for x into two of equations (31), (32), and (33) gives y=1. Thus, cell site 3 is located at (1/2, 1).

It will be understood to those having skill in the art that many changes may be made to the details of the above-described embodiments without departing from the underlying principles of the invention. The scope of the present invention should, therefore, be determined only by the following claims.

The invention claimed is:

1. A system for determining location and timing information in a cellular network having a plurality of cell sites, the system comprising:
   a space-time calibration unit (SCU);
   a plurality of nodes in communication with the SCU, each node comprising a node ping driver configured to receive frame synchronization information from a respective subset of cell sites, associate the frame synchronization information with respective receive count stamps generated using a local node clock, and provide the frame synchronization information and associated receive count stamps to the SCU; and a user handset comprising a handset ping driver configured to receive the frame synchronization information from a serving cell site and one or more neighbor cell sites, associate the frame synchronization information with respective receive count stamps generated using a local handset clock, and provide the frame synchronization information and associated receive count stamps to the SCU;

wherein the SCU is configured to determine a user handset location based at least in part on the frame synchronization information with its associated receive count stamps obtained from the node ping drivers and handset ping driver, and to provide the user handset location to the user handset.

2. The system of claim 1, wherein the SCU is further configured to determine cell site locations based on known node locations and the frame synchronization information with its associated receive count stamps.

3. The system of claim 2, wherein the SCU is further configured to determine the user handset location based on the determined cell site locations and known node locations.

4. The system of claim 3, wherein the known node locations are manually determined and provided to the respective nodes as the nodes are installed within the system.

5. The system of claim 3, wherein the known node locations are automatically determined using a global positioning system (GPS).

6. The system of claim 5, wherein at least one of the nodes is mobile.

7. The system of claim 1, wherein the SCU is located within at least one location selected from the group comprising a server in communication with the cell sites, one or more of the cell sites, one or more of the nodes, and the user handset.

8. The system of claim 1, wherein the SCU determines the user handset location by:
   generating a cell site list comprising the serving cell site and the one or more neighbor cell sites that are in communication with the user handset;
   generating a node list comprising at least one node for the serving cell site and each of the one or more neighbor cell sites in the cell site list;
   for a particular frame number corresponding to the frame synchronization information, comparing the associated receive count stamp generated using the local handset clock to the associated receive count stamps generated using the local node clocks in each of the nodes in the node list; and
   determining the user handset location based on the comparison.

9. A method for determining location and timing information in a cellular network having a plurality of cell sites, the method comprising:
   receiving, at a plurality of nodes, frame synchronization information from respective subsets of cell sites and associating the frame synchronization information with respective receive count stamps generated using local node clocks;
   receiving, at a user handset, the frame synchronization information from a serving cell site and one or more neighbor cell sites and associating the frame synchronization information with respective receive count stamps generated using a local handset clock;
   determining a user handset location based at least in part on the frame synchronization information with its associated receive count stamps obtained from the plurality of nodes and the handset; and
   communicating the user handset location to the user handset.

10. The method of claim 9, further comprising determining cell site locations based on known node locations and the frame synchronization information with its associated receive count stamps.

11. The method of claim 10, further comprising determining the user handset location based on the determined cell site locations and known node locations.

12. The method of claim 11, further comprising manually determining the known node locations and providing the known node locations to the respective nodes as the nodes are installed within the system.

13. The method of claim 11, further comprising automatically determining the known node locations using a global positioning system (GPS).

14. The method of claim 13, wherein at least one of the nodes is mobile.

15. The method of claim 9, wherein determining the user handset location comprises:
   generating a cell site list comprising the serving cell site and the one or more neighbor cell sites that are in communication with the user handset;
   generating a node list comprising at least one node for the serving cell site and each of the one or more neighbor cell sites in the cell site list;
   for a particular frame number corresponding to the frame synchronization information, comparing the associated receive count stamp generated using the local handset clock to the associated receive count stamps generated using the local node clocks in each of the nodes in the node list; and
   determining the user handset location based on the comparison.

16. A system for determining location and timing information in a cellular network having a plurality of cell sites, the system comprising:
   means for receiving, at each of a plurality of nodes, frame synchronization information from respective subsets of cell sites and associating the frame synchronization information with respective receive count stamps generated using local node clocks;
   means for receiving, at a user handset, the frame synchronization information from a serving cell site and one or more neighbor cell sites and associating the frame synchronization information with respective receive count stamps generated using a local handset clock;
   means for determining a user handset location based at least in part on the frame synchronization information with its associated receive count stamps obtained from the plurality of nodes and the handset; and
   means for communicating the user handset location to the user handset.

* * * * *